United States Patent [19]
Urbanek et al.

[11] 3,981,459
[45] Sept. 21, 1976

[54] PHOTOELECTROPHORETIC ELECTROSTATIC TACKING CAPSTAN WEB TENSION SYSTEM

[75] Inventors: Edwin A. Urbanek, Penfield; Roger G. Teumer, Fairport, both of N.Y.

[73] Assignee: Xerox Corporation, Stamford, Conn.

[22] Filed: Apr. 24, 1975

[21] Appl. No.: 571,327

[52] U.S. Cl. .............................. 242/75.44; 226/195
[51] Int. Cl.² ................................................ B65H 59/00
[58] Field of Search ............ 242/75.41, 75.43, 75.44, 242/67.5; 226/195; 204/300

[56] References Cited
UNITED STATES PATENTS

| | | | |
|---|---|---|---|
| 1,995,722 | 3/1935 | Smith | 242/75.44 |
| 2,168,023 | 8/1939 | Dymeck | 242/75.44 |
| 3,250,488 | 5/1966 | Prager | 242/75.4 |
| 3,255,979 | 6/1966 | Treff | 242/75.44 |
| 3,257,086 | 6/1966 | Drenning | 242/75.4 |

*Primary Examiner*—Edward J. McCarthy
*Attorney, Agent, or Firm*—James J. Ralabate; Michael H. Shanahan; Charles E. Smith

[57] ABSTRACT

A photoelctrophoretic imaging apparatus for controlling tension of a transported conductive web. In a preferred embodiment, the web tension is controlled by an electrostatic capstan roller driven by an A.C. motor and gear box through an overdriven clutch. Tension is supplied to the web from the electrostatic capstan roller through electrostatic tacking force between the roller and the web. The electrostatic tacking force is obtained by grounding the conductive side of the web and applying a pulsed D.C. voltage to the rolls.

4 Claims, 21 Drawing Figures

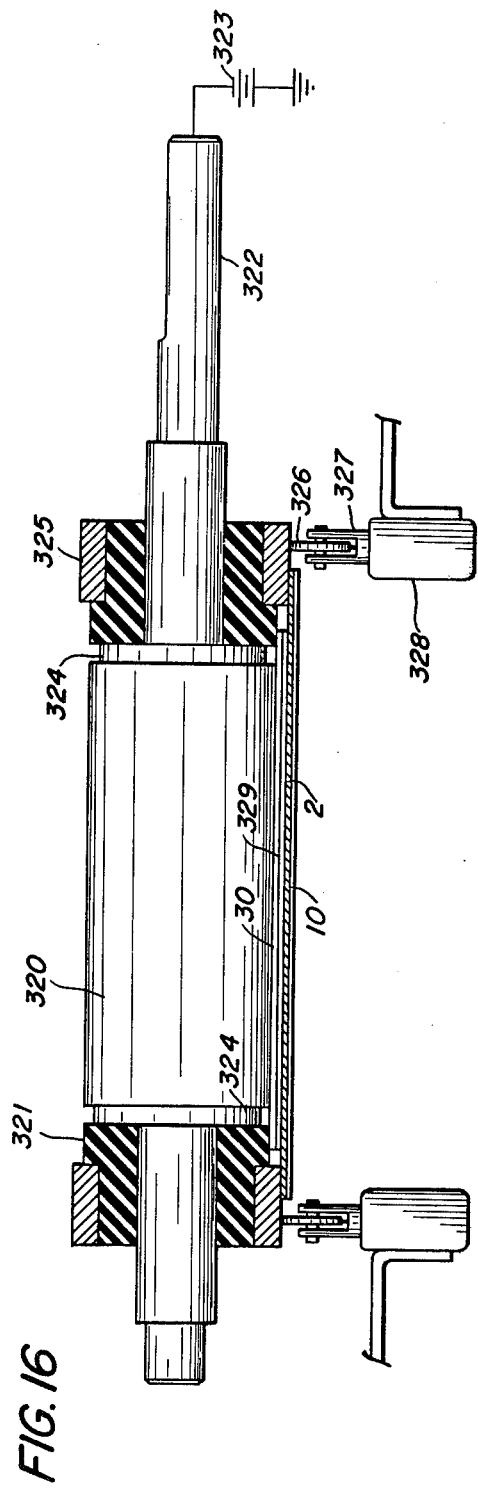
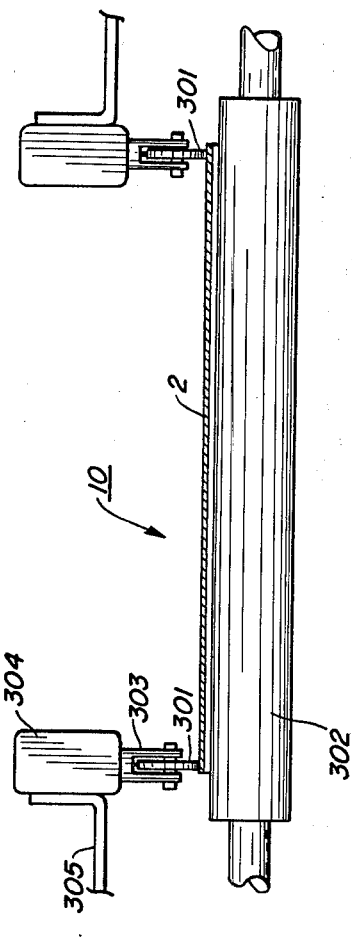
FIG. 16
FIG. 15

PHOTOELECTROPHORETIC ELECTROSTATIC TACKING CAPSTAN WEB TENSION SYSTEM

BACKGROUND OF THE INVENTION

This invention relates in general to photoelectrophoretic imaging machines and, more particularly, an improved web device copier photoelectrophoretic imaging machine.

In the photoelectrophoretic imaging process monochromatic including black and white or full color images are formed through the use of photoelectrophoresis. An extensive and detailed description of the photoelectrophoretic process is found in U.S. Pat. Nos. 3,384,488 and 3,383,565 to Tulagin and Carreira; 3,383,993 to Yeh and 3,384,566 to Clark, which disclose a system where photoelectrophoretic particles migrate in image configuration providing a visible image at one or both of two electrodes between which the particles suspended within an insulating carrier is placed. The particles are electrically photosensitive and are believed to bear a net electrical charge while suspended, which causes them to be attracted to one electrode and apparently undergo a net change in polarity upon exposure to activating electromagnetic radiation. The particles will migrate from one of the electrodes under the influence of an electric field through the liquid carrier to the other electrode.

The photoelectrophoretic imaging process is either monochromatic or polychromatic depending upon whether the photosensitive particles within the liquid carrier are responsive to the same or different portions of the light spectrum. A full-color polychromatic system is obtained, for example, by using cyan, magenta and yellow colored particles which are responsive to red, green and blue light, respectively.

In photoelectrophoretic imaging generally, and as employed in the instant invention, the important broad teachings in the following five paragraphs should be noted.

Preferably, as taught in the four patents referred to above, the electric field across the imaging suspension is applied between electrodes having certain preferred properties, i.e., an injecting electrode and blocking electrode, and the exposure to activating radiation occurs simultaneously with field application. However, as taught in various of the four patents referred to above and Luebbe et al, U.S. Pat. No. 3,595,770; Keller et al, U.S. Pat. No. 3,647,659 and Carreira et al, U.S. Pat. No. 3,477,934, such a wide variety of materials and modes for associating an electrical bias therewith, e.g., charged insulating webs, may serve as the electrodes, i.e., the means for applying the electric field across the imaging suspension, that opposed electrodes generally can be used; and that exposure and electric field applying steps may be sequential. In preferred embodiments herein, one electrode may be referred to as the injecting electrode and the opposite electrode as the blocking electrode. This is a preferred embodiment description. The terms blocking electrode and injecting electrode should be understood and interpreted in the context of the above comments throughout the specification and claims hereof.

It should also be noted that any suitable electrically photosensitive particles may be used. Kaprelian, U.S. Pat. No. 2,940,847 and Yeh, U.S. Pat. No. 3,681,064 disclose various electrically photosensitive particles, as do the four patents first referred to above.

In a preferred mode, at least one of the electrodes is transparent, which also encompasses partial transparency that is sufficient to pass enough electromagnetic radiation to cause photoelectrophoretic imaging. However, as described in Weigl, Patent No. 3,616,390, both electrodes may be opaque.

Preferably, the injecting electrode is grounded and a suitable source of difference of potential between the injecting and blocking electrodes is used to provide the field for imaging. However, such a wide variety of variations in how the field may be applied can be used, including grounding the blocking electrode and biasing the injecting electrode, biasing both electrodes with different bias values of the same polarity, biasing one electrode at one polarity and biasing the other at the opposite polarity of the same or different values, that just applying sufficient field for imaging can be used.

The photoelectrophoretic imaging system disclosed in the above-identified patents may utilize a wide variety of electrode configurations including a transparent flat electrode configuration for one of the electrodes, a flat plate or roller for the other electrode used in establishing the electric field across the imaging suspension.

The photoelectrophoretic imaging system of this invention utilizes web materials, which optimally may be disposable. In this system, the desired, e.g., positive image, is formed on one of the webs and another web will carry away the negative or unwanted image. The positive image can be fixed to the web upon which it is formed or the image transferred to a suitable backing such as paper. The web which carries the negative image can be rewound and later disposed of. In this successive color copier photoelectrophoretic imaging system employing consumable webs, cleaning systems are not required.

Web machine patents may be found in the photoelectrophoretic, electrophotography, electrophoresis and coating arts. In the photoelectrophoresis area is Mihajlov U.S. Pat. No. 3,427,242. This patent discloses continuous photoelectrophoretic apparatus but using rotary drums for the injecting and blocking electrodes instead of webs. The patent to Mihajlov also suggests the elimination of cleaning apparatus by passing a web substrate between the two solid rotary injecting and blocking electrodes. U.S. Pat. No. 3,586,615 to Carreira suggests that the blocking electrode may be in the form of a continuous belt. U.S. Pat. No. 3,719,484 to Egnaczak discloses continuous photoelectrophoretic imaging process utilizing a closed loop conductive web as the blocking elecrode in conjunction with a rotary drum injecting electrode. This system uses a continuous web cleaning system but suggests consumable webs in place of disclosed continuous webs to eliminate the necessity for cleaning apparatus. U.S. Pat. No. 3,697,409 to Weigl discloses photoelectrophoretic imaging using a closed loop or continuous injecting web in direct contact with a roller electrode and suggests that the injecting web may also be wound between two spools. U.S. Pat. No. 3,697,408 discloses photoelectrophoretic imaging using a single web but only one solid piece. U.S. Pat. No. 3,702,289 discloses the use of two webs but two solid surfaces. U.S. Pat. No. 3,477,934 to Carreira discloses that a sheet of insulating material may be arranged on the injecting electrode during photoelectrophoretic imaging. The insulating material may comprise, inter alia, baryta paper, cellulose acetate or polyethylene coated papers. Exposure may be made through the injecting electrode or blocking electrode.

U.S. Pat. No. 3,664,941 to Jelfo teaches that bond paper may be attached to the blocking electrode during imaging and that exposure could be through the blocking electrode where it is optically transparent. This patent further teaches that the image may be formed on a removable paper substrate or sleeve superimposed or wrapped around a blocking electrode or otherwise in the position between the electrode at the site of imaging.

U.S. Pat. No. 3,772,013 to Wells discloses a photoelectrophoretic stimulated imaging process and teaches that a paper sheet insulating film may be removed from the apparatus and the image fused thereto.

U.S. Pat. Nos. 3,761,174 and 3,642,363 to Davidson disclose apparatus for effecting the manifold imaging process wherein an image is formed by the selective transfer of a layer of imaging material sandwiched between donor and receiver webs.

U.S. Pat. No. 2,376,922 to King; 3,166,420 to Clark; 3,182,591 to Carlson and 3,598,597 to Robinson are patents representative of web machines found mostly in the general realm of electrophotography. These patents disclose the broad concept of bringing two webs together, applying a light image thereto at the point of contact and by the application of an electric field effecting a selective imagewise transfer to toner from one web to the other.

SUMMARY OF THE INVENTION

It is an object of this invention to provide an improved photoelectrophoretic imaging machine employing the use of disposable webs.

Anoter object of this invention is to provide a photoelectrophoretic imaging machine which does not require the use of complex cleaning systems.

Another object of the present invention is to provide a photoelectrophoretic imaging machine capable of utilizing both opaque and transparent inputs.

Still another object of this invention is to provide a photoelectrophoretic imaging machine designed to provide maximum flexibility for changes in process configuration and not thereby unduly upset the remaining portions of the machine.

Yet another object of the present invention is to provide a photoelectrophoretic imaging device designed so that two webs are driven in synchronism at the imaging and transfer stations.

Still a further object of this invention is to provide a photoelectrophoretic imaging machine in which fresh web surfaces are used for each image.

These and other objects of this invention are accomplished by the use of a photoelectrophoretic imaging machine for producing, in a preferred embodiment, full color copies from opaque originials or, alternatively, copies from transparencies.

In a preferred embodiment, the formation of photoelectrophoretic images occur between two thin injecting and blocking webs at least one of which is partially transparent and the image formed is transferred to a paper web. The injecting and blocking webs may be disposable, thus, cleaning systems are not required. The injecting web is provided with a conductive surface and is driven in a path to the inking station where a layer to photoelectrophoretic ink is applied to the conductive web surface. The inked injecting web is driven in a path passing in close proximity to a deposition scorotron at the precharge station and into contact with the blocking web to form the ink-web sandwich at the imaging roller in the imaging zone. The conductive surface of the injecting web is grounded and a high voltage is applied to the imaging roller subjecting the sandwich to a high electric field at the same time as the scanning optical image is focussed on the nip or interface between the injecting and blocking webs, and development takes place. The photoelectrophoretic image is carried by the injecting web to the transfer zone, into contact with the paper web at the transfer roller where the image is transferred to the paper web giving the final copy.

BRIEF DESCRIPTION OF THE DRAWINGS

These and other advantages will become apparent to those skilled in the art after reading the following description taken in conjunction with the accompanying drawings wherein:

FIG. 15 is an elevation, partially sectional view of one embodiment for grounding the conductive web;

FIG. 16 shows an elevation, partially sectional view of the imaging roller and grounding mechanism;

DESCRIPTION OF THE PREFERRED EMBODIMENTS

The invention herein is described and illustrated in specific embodiments having specific components listed for carrying out the functions of the apparatus. Nevertheless, the invention need not be thought as being confined to such specific showings and should be construed broadly within the scope of the claims. Any and all equivalent structures known to those skilled in the art can be substituted for specific apparatus disclosed as long as the substituted apparatus achieves a similar function. It may be that systems other than photoelectrophoretic imaging systems will be invented wherein the apparatus described and claimed herein can be advantageously employed and such other uses are intended to be encompassed in this invention as described and claimed herein.

THE PHOTOELECTROPHORETIC WEB DEVICE MACHINE

Figure 1:
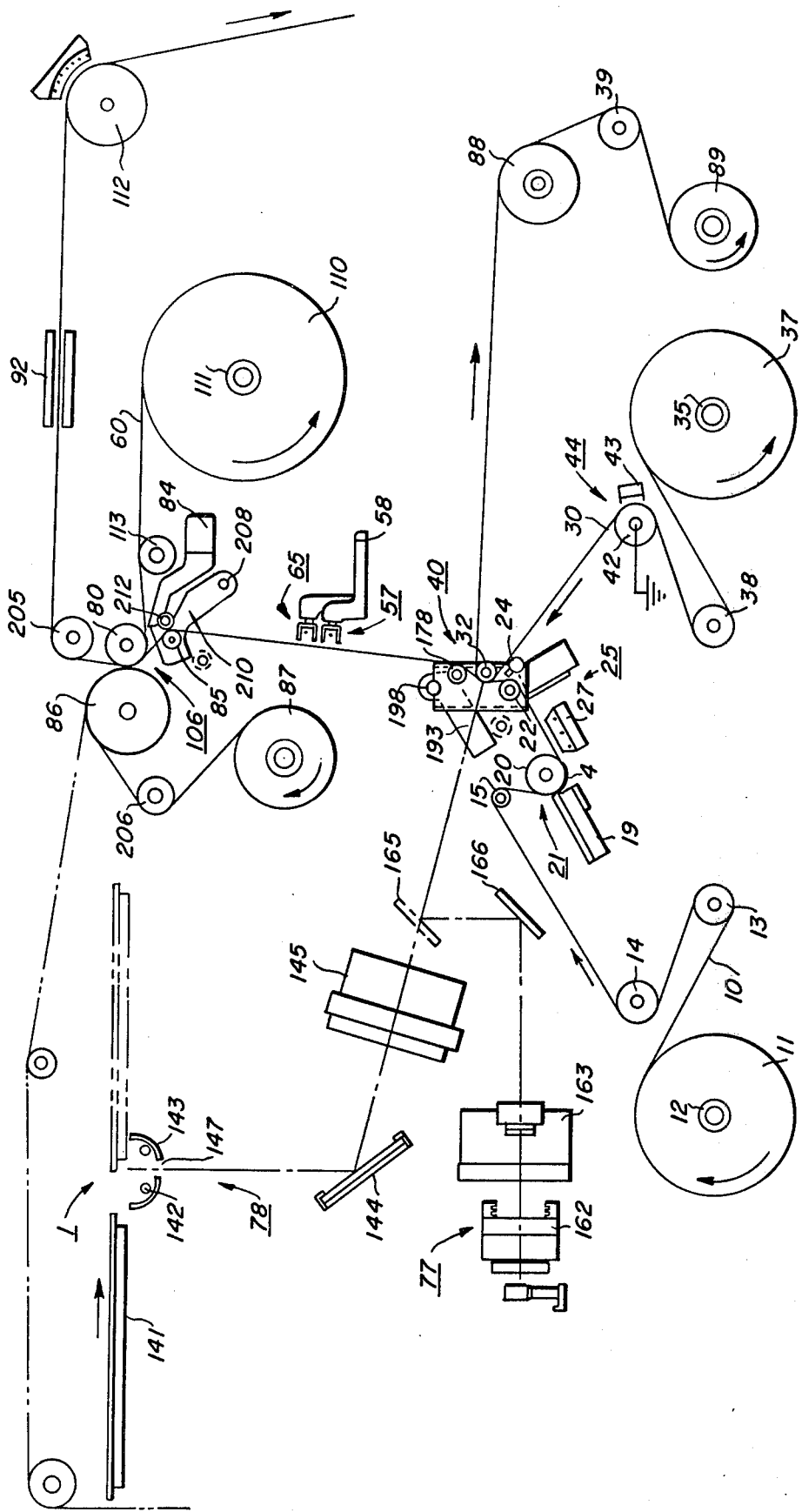
FIG. 1 is a simplified layout, side view, partially schematic diagram of a preferred embodiment of the web device photoelectrophoretic imaging machine according to this invention.

The FIG. 1 shows a simplified layout, side view, partially schematic diagram of the preferred embodiment of the web device color copier photoelectrophoretic imaging machine 1, according to this invention. Three flexible thin webs, the injecting web 10, the blocking web 30, which may be consumable, and the paper web 60 are employed to effect the basic photoelectrophoretic imaging process.

The photoelectrophoretic imaging process is carried out between the flexible injecting and blocking webs. The conductive or injecting web 10 is analogous to the injecting electrode described in earlier basic photoelectrophoretic imaging systems. The injecting web 10 is initially contained on the prewound conductive web supply roll 11, mounted for rotation about the axis 12 in the direction of the arrow. The conductive web 10 may be formed of any suitable flexible transparent or semi-transparent material. In one preferred embodiment, the conductive web is formed of an about 1 mil Mylar, a polyethylene terephthalate polyester film from DuPont, overcoated with a thin transparent conductive material, e.g., about 50% white light transmissive layer of aluminum. When the injecting web 10 takes this construction, the conductive surface is preferably connected to a suitable ground at the imaging roller or at some other convenient roller located in the web path. The bias potential applied to the conductive web surface is maintained at a relatively low value. Methods for biasing the conductive web will be explained in more particularity hereinlater. Also, by proper choice of conductor material, programmed voltage application could be used resulting in the elimination of defects caused by lead edge breakdown. The term "lead edge breakdown", as used herein, refers to a latent image defect which manifests itself in the form of a series of dark wide bands at the lead edge of a copy. Lead edge breakdown defects are believed to be caused by electrical air breakdown or air ionization at the entrance to the imaging zone.

From the conductive web supply 11, the conductive web 10 is driven by the capstan drive roller 86 to the idler rollers 13, 14 and 15. The web 10 is driven from the idler rollers 13–15 to the inker 19 and backup roller 20 at the inking station generally represented as 21.

The inker 19 is utilized to apply a controlled quantity of photoelectrophoretic ink or imaging suspension 4 to the conductive surface of the injecting web 10 of the desired thickness and length. Any suitable inker capable of applying ink to the required thickness and uniformity across the width of the web may be used. For example, the applicator described in copending application Ser. No. 444,942 entitled "Coating Apparatus and Uses Thereof", filed Feb. 22, 1974, may be adapted for use herein. Another example of an inker that may be adapted for use herein is the inker mechanisms described in U.S. Pat. No. 3,800,743, issued Apr. 2, 1974, by Raymond K. Egnaczak.

In some instances, it may be desirable to use a rigid shoe type device, preferably with a small angle of wrap for the web and a larger radius instead of using the rotating backup roller 20. In instances where rotating rollers are used to support the conductive web during inking web support may be limited to a degree, in terms of rigidity of the configuration, to the yield of the roller shaft bearings when web tension loads are present. Also, the shaft eccentricity or non-concentricity, and the out-of-round of the roller surface, may be factors in determining the ink film thickness tolerance. Thus, the use of a rigid arcuate shoe device for the inker backup eliminates use of rollers and bearings, thereby simplifying machine design maintenance and thereby reduce cost.

From the inking station 21, the conductive web 10 is driven in a path passing the close proximity to the precharged station generally represented at 25. The precharge station 25 will be described more fully hereinafter.

When the conductive web 10, which now contains the coated ink film 4, exits the precharge station 25, the conductive web 10 is driven in a path around the separator roller 22 toward the imaging roller 32 in the imaging zone 40. The blocking web 30, which is analogous to the blocking electrode described in earlier photoelectrophoretic imaging systems, is initially contained on the prewound blocking web supply roll 37 mounted for rotation about the axis 35 in the direction of the arrow. The blocking web 30 is driven from the supply roll 37 by the capstan drive roller 88 in the path around the idler roller 38 to the charge roller 42 and corotron 43 at the blocking web charge station generally represented as 44. The blocking web charge station will be described in more particularity hereinafter.

The blocking web 30 may be formed of any suitable blocking electrode dielectric material. In one preferred embodiment, the blocking web 30 may be formed of a polypropylene blocking electrode material which, as received from the vendor on the prewound supply roll 37, may be laden with random static charge patterns. These random static charge patterns have been found to vary in intensity from 0 to ±300 volts, and can cause defects in the final image copy. The blocking web charge station 44, as will be explained more fully hereinafter, may be utilized to remove the random static charge patterns or at dampen the randomness thereof, from the polypropylene blocking web material.

Still referring mainly to FIG. 1, the conductive web 10 and blocking web 30 are driven together into contact with each other at the imaging roller 32. When the ink film 4, on the conductive web 10, reaches the imaging roller 32, the ink-web sandwich is formed and is, thereby, ready for the imaging-development step to take place. The imaging step also comprises deposition and electrophoretic deagglomeration or ink splitting processes. Although the steps of "deposition", "electrophoretic deagglomeration" and "imaging" are referred to herein as being separate and distinct process steps in actuality, there is undoubtedly some overlap of the spatial and temporal intervals during which these three phenomena occur within the "nip" region. The term nip, as used herein, refers to that area proximate the imaging roller 32 where the conductive web 10 and blocking web 30 are in close contact with each other and the ink-web sandwich is formed in the imaging zone 40. The term imaging zone, as used herein, is defined as the area in which the conductive and blocking webs contact to form the nip where the optical image is focussed and exposure and imaging take place.

During the portion of the imaging step when the conductive web 10 and blocking web 30 are in contact, imaging suspension sandwiched between them at the imaging roller 32, the scanning optical image of an original is focussed between the webs. Exposure of the image is accomplished at the same time as the high voltage is being applied to the imaging roller. The photoelectrophoretic imaging machine of this invention is capable of accepting either transparency inputs from the transparency optical assembly designated as 77 or opaque optical assembly represented as 78. The transparency and optical assemblies will be described in more particularity hereinafter.

When the conductive and blocking webs are brought together and the layer of ink film 4 reaches the imaging zone 40 to form the ink-web sandwich, the imaging roller 32 is utilized to apply a uniform electrical imaging field across the ink-web sandwich. The combination of the presssure exerted by the tension of the injecting web and the electrical field across the ink-web sandwich at the imaging roller 32 may tend to restrict passage of the liquid suspension, forming a liquid bead at the inlet to the imaging nip. This bead will remain in the inlet to the nip after the coated portion of the web has passed, and will then gradually dissipate through the nip. If a portion of the bead remains in the nip until the subsequent ink film arrives, it will mix with this film and degrade the subsequent images. In one preferred embodiment of this invention, liquid control means is employed to dissipate excess liquid accumulations, if any, at the entrance nip. The liquid control means will be described in detail hereinlater.

While although the field for imaging is preferably established by the use of a grounded conductive web in conjunction with an imaging roller, a non-conductive web pair in conjunction with a roller and corona device may be utilized to establish the electrical field for imaging. In the non-conductive web and corona source embodiment, the imaging roller 32 may be grounded in order to obtain the necessary field for imaging.

Still refering mainly to FIG. 1, after the process steps of pigment discharge at the discharge station 57 and recharge at the recharge station 65 (or optionally, only recharge) the conductive web 10 carries the image into the transfer zone 106 into contact with the paper web 60 to form the image-web sandwich, and the transfer step is accomplished. When the conventional electrostatic transfer method is used, the copy or paper web 60 may be in the form of any suitable paper. The paper web 60 is initially contained on the paper web supply roll 110 and is mounted for rotation about the shaft 11 in the direction of the arrow.

The photoelectrophoretic image on the conductive web 10, approaching the transfer zone 106, may include oil and pigment outside the actual copy format area and may also include excess liquid bead at the trailing edge. When the transfer step is completed, the conductive-transfer web separator roller 85 is moved to the standby position indicated by the dotted outline. This separates the conductive web 10 and paper web 60 briefly, to allow the excess liquid bead to pass the transfer zone 106 before the separator roller 85 is moved to its original position bringing the webs back into contact. A more particular description of the transfer zone will follow.

The conductive web 10 is transported by drive means away from the transfer zone 106 around the capstan roller 86 to the conductive web takeup or rewind roll 87. When the conductive web is completely rewound onto the takeup roll 87, it may be disposed of. In an alternative embodiment, the takeup roll 87 may be substituted for by an electrostatic tensioning device and the image on the web saved for observation or examination. The electrostatic tensioning device will be described in more particularity hereinafter.

The blocking web 30, which contains the negative image after the imaging step is transported by drive means around the capstan roller 88 to the blocking web takeup or rewind roll 89. When the blocking web is completely rewound onto the takeup roll 89, it may be removed from the machine and disposed of. The paper web 60 is initially contained on the paper web supply roll 110 and is transported by drive means to the transfer zone 106, and, therefrom, to fixing station 92 and around the capstan roller 112. The machine web drive system for the conductive, blocking and paper webs will be described in more detail hereinafter.

Figure 2:
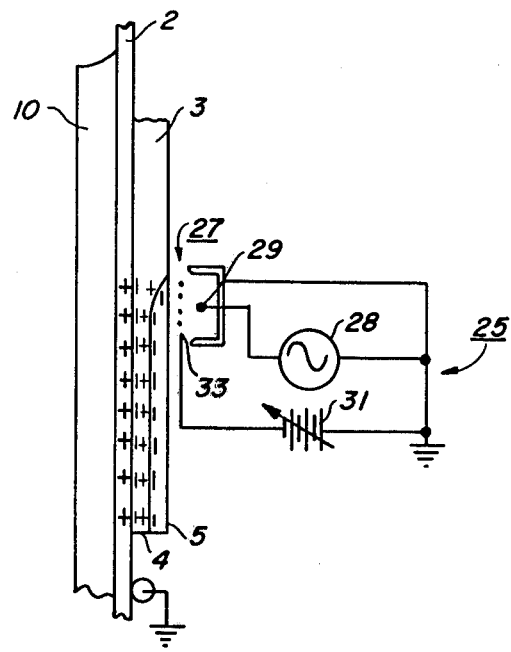
FIG. 2 is a side view, partially schematic diagram of the photoelectrophoretic imaging machine precharge station.

Referring now to FIG. 2, there is shown a side view, partially schematic diagram for illustrating operation of the machine precharge station 25 whereat a uniform charge is applied to the ink film by the scorotron device. Any suitable conventional corona charging device may be used. The scorotron 27 is preferred, however, because with this type of charging unit a charge of uniform potential, rather than uniform charge density, is applied to the ink film. The coated conductive web 10 passes from the inker station to the scorotron assembly 27 at the precharge station 25 where a uniform charge is applied. The inking or backup roller and separation roller cooperate to guide the injecting web 10 in a path passing in close proximity of the deposition scorotron assembly 27 at the precharge station 25. The precharge station, in the direction of travel of the web 10, is located in advance of the imaging station or zone 40, and is used to accomplish the "dark deposition" step. The term dark deposition, as used herein, may be defined as the process of depositing all of the pigment particles onto the injecting web 10 and conductive surface 2 precisely where they were coated. Dark deposition is accomplished herein by passing the ink film 3 in the vicinity of the scorotron assembly 27 in the dark, i.e., in the absence of visible radiation. A complete description of the dark charge process is found in U.S. Pat. No. 3,477,934 to Carreira et al.

The balanced A.C. electrical potential source 28 is use to couple an A.C. voltage to the coronode 29, and the D.C. voltage source 31 is used to apply a negative voltage to the scorotron shield or screen 33. The electrostatic charge placed upon the ink film or imaging suspension 3 by scorotron 27, while optional, can be quite important to the overall characteristics of the final image. For example, process speed, color balance and image defects are affected.

Figure 3:
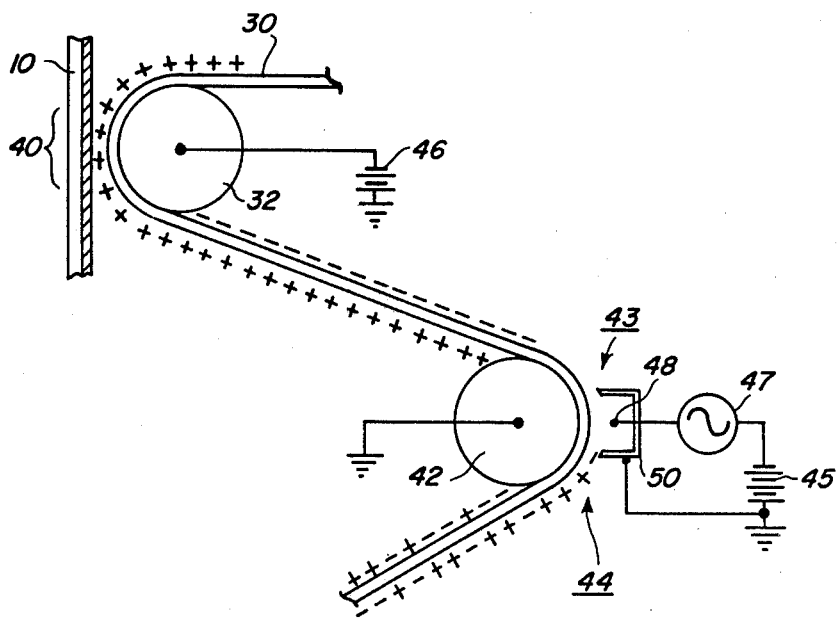
FIG. 3 is a side view, partially schematic diagram illustrating the blocking web charging station.

Turning now to FIG. 3, there is shown a side view, partially schematic diagram illustrating the blocking web charging station. The blocking web charging station 44 is used to eliminate random charge pattern defects. In order to eliminate defects which may be caused by random static charge pattern in polypropylene blocking web material, a bias charge of about −200 volts is applied to the blocking web 30 before entering the imaging zone by the charge corotron 43 at the grounded charge roller 42. Charging the blocking web 30 with the corotron 43 eliminates the random static charge patterns and charges it to a uniform electrostatic charge potential. For example, a positive (+) charge may be provided on the imaging side of the blocking web and a negative (−) charge on the non-imaging side of the blocking web 30. Charged in this manner, the imaging surface of the blocking web 30 does not act as a doner of electrons to the ink coating during the imaging step. It will be appreciated that charges of either polarity may be used in the system to eliminate random static charge pattern.

Still referring to FIG. 3, the corotron 43 is positioned at the charge station 44 to apply a negative electrostatic charge potential to the non-imaging side of the blocking web 30, thereby opposing the imaging D.C. potential 46 coupled to the core of the imaging roller 32. The A.C. potential source 47 is used to couple and A.C. voltage to the coronode 48 and the D.C. voltage source 45 is used to bias the A.C. source.

Figure 4:
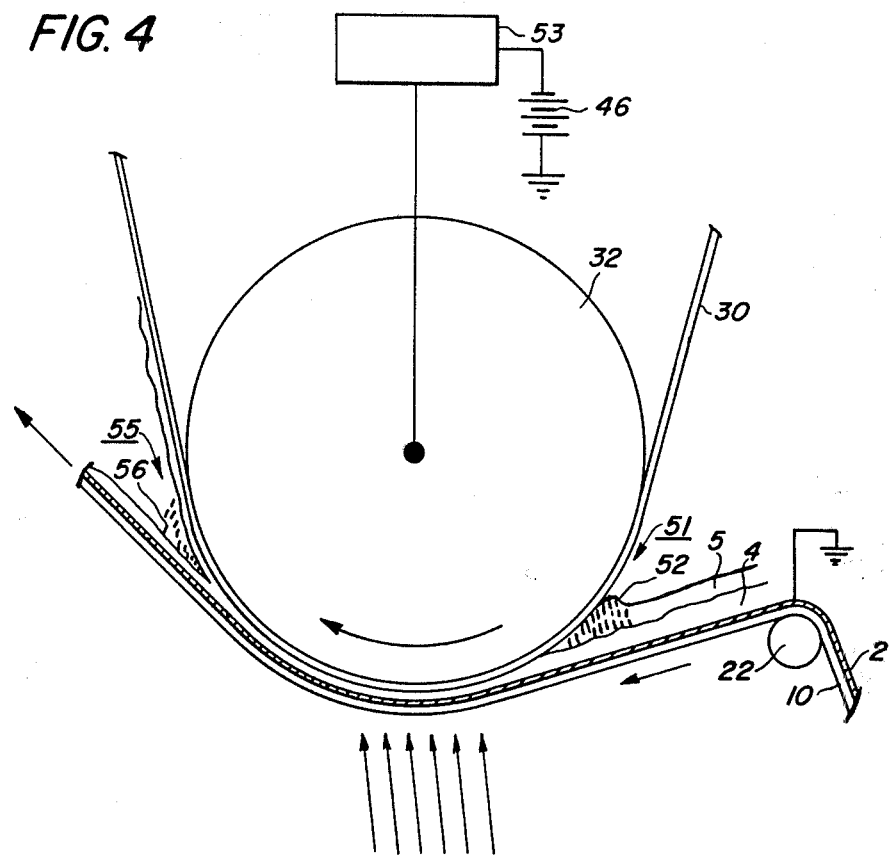
FIG. 4 shows a side view, partially schematic diagram of a detail of the imaging station.

Turning now to FIG. 4, there is shown a side view, partially schematic diagram of a detail of the imaging station 40. The deposited ink film layer or pigment 4 carried on the electrically grounded conductive web 10 approaches the imaging zone nip entrance 51 with an optimum charge potential, say for example, about −60 volt charge potential. The pigment particles in the ink layer are tacked in place to the conductive surface 2 of the web 10 and the mineral oil 5 is on top of the pigment layer 4 surface. The total ink layer thickness in the nip obtained for typical operating conditions is approximately 8 microns, 2 microns for mineral oil layer 5 and 6 microns for pigment layer 4.

Another method which can be utilized for eliminating air breakdown at the entrance to the imaging zone is to ramp the image voltage turn-on-time. In this case, when the ink layer enters the entrance to the imaging zone, the imaging voltage 46 is programmed linearly by the ramping means 53 from its initial low value (even 0) up to the desired imaging voltage. During this process, the bead of oil 52 is building up in the entrance 51 to the imaging zone. In the web machine, the pressure in the nip is mostly electrostatic in nature. The linear voltage ramp process on the web machine provides a means for building up electrostatic pressure to squeeze out the bead of liquid while keeping the voltage below the level which causes air breakdown.

Still referring to FIG. 4, the deposited photoelectrophoretic image which is carried on the conductive web 10 out of the imaging zone exit gap 55, may be subjected to "negative corona" 56, and thereby cause air breakdown at the exit gap 55. Air breakdown at the imaging zone exit gap 55 may occur whenever the electric field across the air spaces between the pigment particles (and electrodes) exceed the Paschen breakdown voltage. This results in a fine line or bar pattern or high and low charge in the image, perpendicular to the direction of web motion, which usually is not evident until the image is electrostatically transferred to a copy sheet and the charge pattern is developed.

Figure 5:
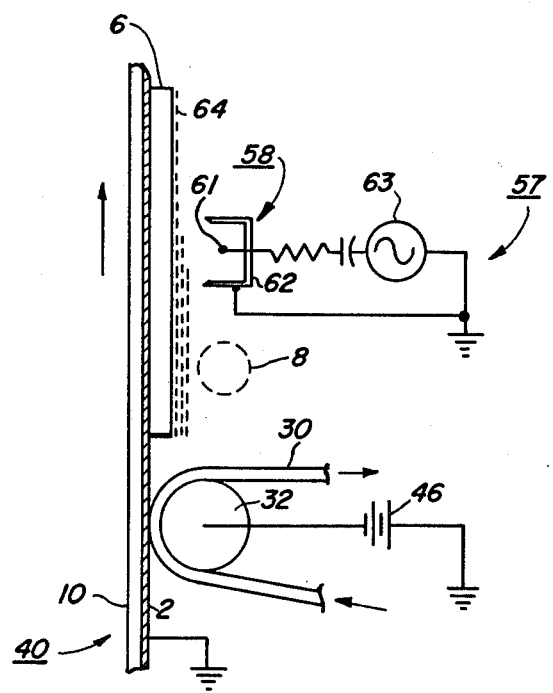
FIG. 5 illustrates a side view, partially schematic diagram of the pigment discharge station.

Turning now to the FIG. 5, there is shown a side view, partially schematic diagram of a preferred embodiment of a method for eliminating image defects resulting from air breakdown at the imaging zone exit gap. The pigment discharge station, designated as 57, while optional, may be used to blot out or neutralize the air breakdown charge pattern generated at the imaging zone exit gap.

The A.C. corotron assembly 58 is employed just beyond the exit of the imaging zone 40 and may be used to discharge the deposited image, thereby eliminating the fine line charge pattern. The corotron coronode 61 is closely spaced from the conductive web 10 surface and the corotron shield 62 is grounded in a suitable manner. The balanced A.C. potential source 63 is coupled to the coronode 61 via the RC series circuit. In one exemplary embodiment, the discharge current produced by the corotron 58 is about 8 microamps per inch at a conductive web velocity of about 5 inches per second. The charge pattern average potential on the pigment layer 6 exiting the imaging zone 40, range in values from about −100 to −200 volts D.C., depending upon the ink film thickness, conductive web velocity and the applied image voltage. After the pigment discharging step at the pigment discharging station 57, the average charge potential 64 falls below about −35 volts D.C. The results are that the transferred image is free of the bar pattern. Also, maintaining a uniform and constant charge level on the photoelectrophoretic image prior to transfer facilitates better control of the transfer process step.

Still referring to the FIG. 5, in an alternative embodiment, the fine line charge pattern may be eliminated by the ultraviolet (U.V.) radiation source 8. In this embodiment, the U.V. radiation source 8 (having a wavelength shorter than wavelengths of visible light) is substituted in place of the A.C. corotron assembly 58 to discharge unwanted charge pattern.

At low charge potentials, say below about −35 volts, the transferred image may suffer from unsharpness due to pigment "running". To achieve a more optimum transfer, the deposited photoelectrophoretic image 6 may be recharged prior to entering the transfer zone.

Figure 6:
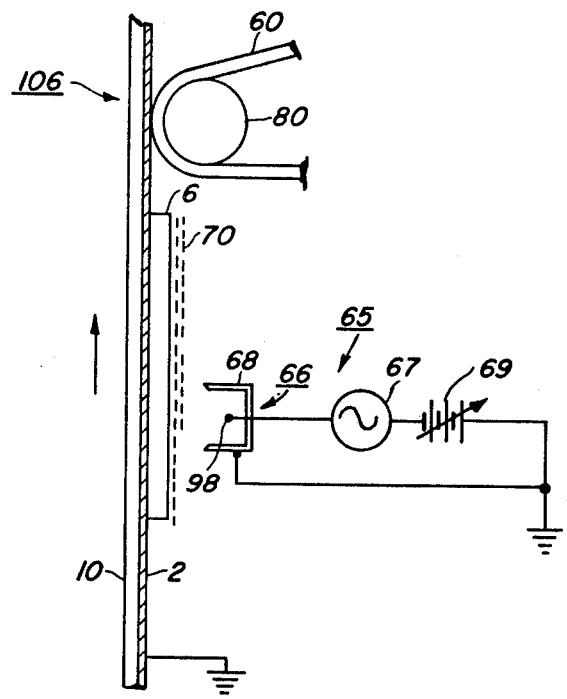
FIG. 6 is a side view, partially schematic diagram of the pigment recharge station.

Referring now to FIG. 6, there is illustrated a side view, partially schematic diagram of the pigment recharge station generally represented as 65, located in the direction of travel of the conductive web 10 before the transfer zone represented as 106. The negatively biased A.C. corotron 66 is employed prior to the transfer zone to recharge the image 6 carried out of the discharging station 57 on the conductive web 10. The corotron coronode 98 is spaced from the surface of the conductive web 10 and is coupled to the A.C. potential source 67. The corotron shield 68 is grounded. The A.C. potential source 67 is negatively biased by the variable D.C. voltage source 69. In one exemplary embodiment, the recharge currents are nominally about 10 micro-amps per inch, RMS, for the A.C. component and about −5 micro-amps per inch for the average D.C. component with a bias setting of about −1.0 KV and the conductive web velocity of about 5 inches per second. Typically, these parameters produce an optimum recharge potential at 70 of about −65 volts D.C. on the deposited pigment layer 6 when using photoelectrophoretic ink of particular characteristics.

Figure 7:
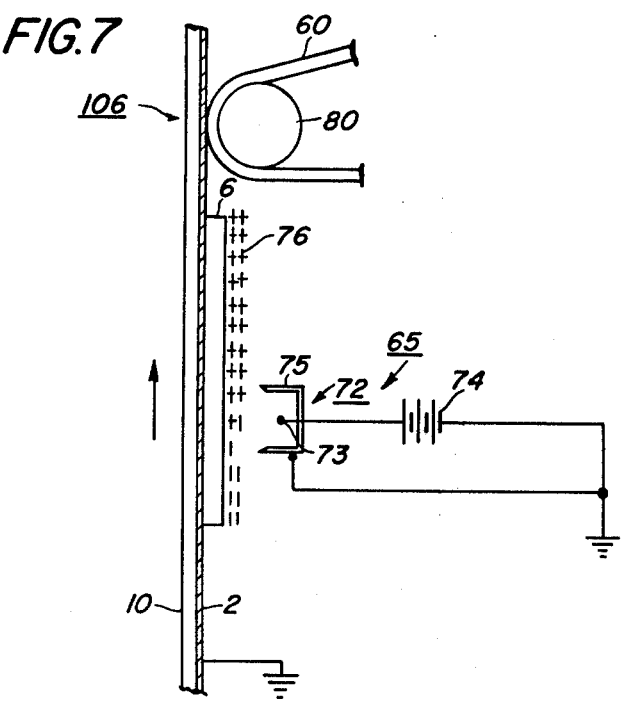
FIG. 7 is an alternative embodiment for the pigment recharge station of FIG. 6.

Turning now to FIG. 7, there is shown a side view, partially schematic diagram of a preferred alternative embodiment for the pigment recharge station. In the FIG. 7 embodiment, the pigment recharge station 65 uses the positive D.C. corotron 72 prior to the transfer zone 106, to recharge the deposited photoelectrophoretic image 6. The corotron coronode 73 is spaced closely from the surface of the conductive web 10 and connected to the positive terminal of the D.C. potential source 74. The corotron shield 75 is grounded. In one example, the D.C. potential source 74 may be about +9 KV D.C. Typically, the recharge current is about 30 micro-amps per inch. These parameters produce an optimum recharge potential 76 on the deposited photoelectrophoretic image 6 of about ±160 volts D.C.

Figure 8:
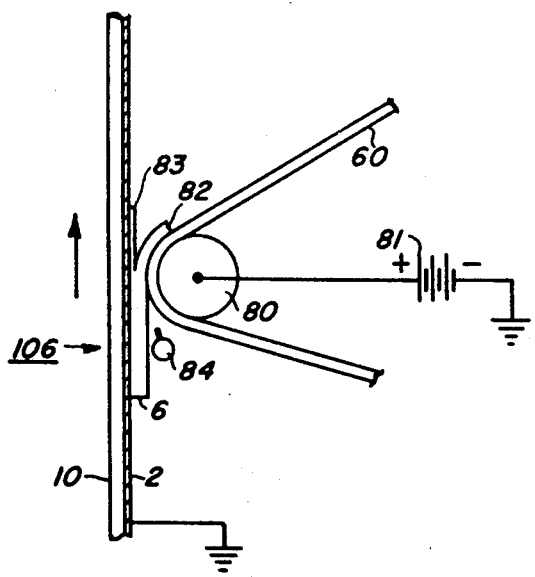
FIG. 8 shows a side view, partially schematic diagram of a detail of the transfer step and method for eliminating air breakdown.

Referring now to FIG. 8, there is shown a side view, partially schematic diagram for illustrating a detail of the transfer step in accordance with one embodiment of this invention. In this embodiment, the deposited photoelectrophoretic image 6 is carried by the conductive web 10 into the transfer zone 106. The paper web 60 is wrapped around the transfer roller 80 which may be formed of conductive metal. In this example, the paper web 60 may take the form of ordinary paper. The positive terminal of the D.C. voltage source 81 is coupled to the transfer roller 80. Typically, voltage source 81 is about +1.4 KV D.C. as the paper web 60 and conductive web 10 are driven into contact with the image 6 sandwiched between them, the paper web 60 is subjected to an electrical charge because it is in contact with the positive transfer roller 80. An electrostatic field is set up through pigment particles to the conductive web 10, which draws the negatively charged pigment particles to the paper web 60 from the conductive web 10 and attaches to the paper web 60. As the paper web is driven around and away from the transfer roller 80, the paper web is thereby separated or peeled away from the conductive web 10, giving the final transferred image 82 on the paper web 60. Substantially all of the pigment or photoelectrophoretic image is transferred onto the paper web 60, however, a small amount of pigment may be left behind in the form of the residual 83 and is carried away by the conductive web 10. The amount of pigment in the residual 83 will usually depend upon such factors as the charge on the pigment particles entering the transfer zone 106, properties of the paper web 60 and the applied transfer voltage by the D.C. potential source 81.

It will be noted that while the embodiments of FIGS. 7 and 8 show a residual image, complete image transfer may be achieved without any significant untransferred image or residual.

The residual or untransferred image 83, if any, is carried away from the transfer zone 106, out of the machine and may be disposed of. Because the conductive web 10 is consumable, there is no requirement for a complex cleaning system for performing a cleaning step. This is an important advantage of this machine over earlier photoelectrophoretic imaging machines.

The transfer process step, under certain circumstances, may be subjected to air breakdown in the gap entrance to the transfer zone 106 in the same manner as discussed earlier with respect to the imaging zone. Air breakdown at the entrance to the transfer zone may result in a defect in the final copy, referred to as "dry transfer". Dry transfer, as used herein, is defined as a defect manifesting itself in the final copy in the form of a speckled or discontinuous and very desaturated appearance.

In order to eliminate air breakdown at the transfer zone entrance gap and thus, eliminate dry transfer defects in the copy, a dispenser 84 is provided to apply dichlorodifluoromethane gas ($CCl_2F_2$), Freon-12 from DuPont, in the entrance gap. The technique of providing dichlorodifluoromethane gas or other high dielectrically insulating gas medium in the transfer zone entrance increases the level of the onset voltage necessary for corona breakdown. Thus, displacing air in the gap entrance in favor of a dichlorodifluoromethane gas atmosphere improves air breakdown characteristics. A vacuum means is provided in the vicinity of the dichlorodifluoromethane gas dispenser 84 to prevent gas from escaping into the atmosphere.

It will also be appreciated that a fluid injecting device 24 (see FIG. 1) may be employed at the inlet nip to the imaging zone 40 to provide air breakdown medium at the imaging nip entrance in the same manner as described with regard to the transfer entrance nip.

Figure 9:
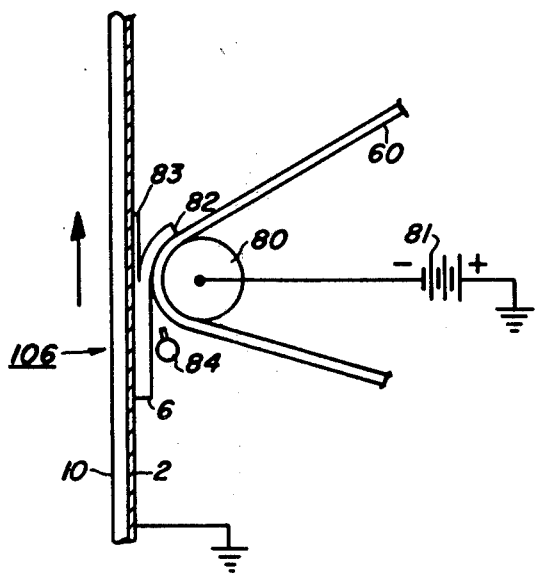
FIG. 9 shows a side view, partially schematic diagram of an alternative embodiment of the transfer step and method for eliminating air breakdown.

Turning now to FIG. 9, there is shown a side view, partially schematic diagram of an alternative embodiment for illustrating the transfer step and method for eliminating air breakdown at the transfer zone entrance gap. The FIG. 9 embodiment differs from the embodiment described with respect to FIG. 8, only in that the transfer roller 80 is coupled to the negative terminal of the D.C. voltage source 81 instead of the positive terminal. It shall be apparent that the FIG. 9 embodiment is utilized whenever the deposited image 6 entering the transfer zone, is charged positive (by a positive D.C. corotron) rather than negative. In this case, the negative 1.4 KV D.C. potential source 81 is coupled to the transfer roller 80. The paper web 60 is charged by being in contact with the negative transfer roller 80. The electrostatic field is set up through the pigment particles to the conductive web 10, which draws the positively charged pigment particles to the paper web 60 from the conductive web 10 and attaches them to the paper web. The paper web 60 is then peeled from the conductive web 10 and contains the final image 82. Practically all of the pigment transfers, and in the manner described with regard to the FIG. 8 embodiment, the untransferred residual 83 is left on the conductive web 10 to be transported out of the machine and later disposed of.

THE MACHINE STRUCTURE

Figure 10:
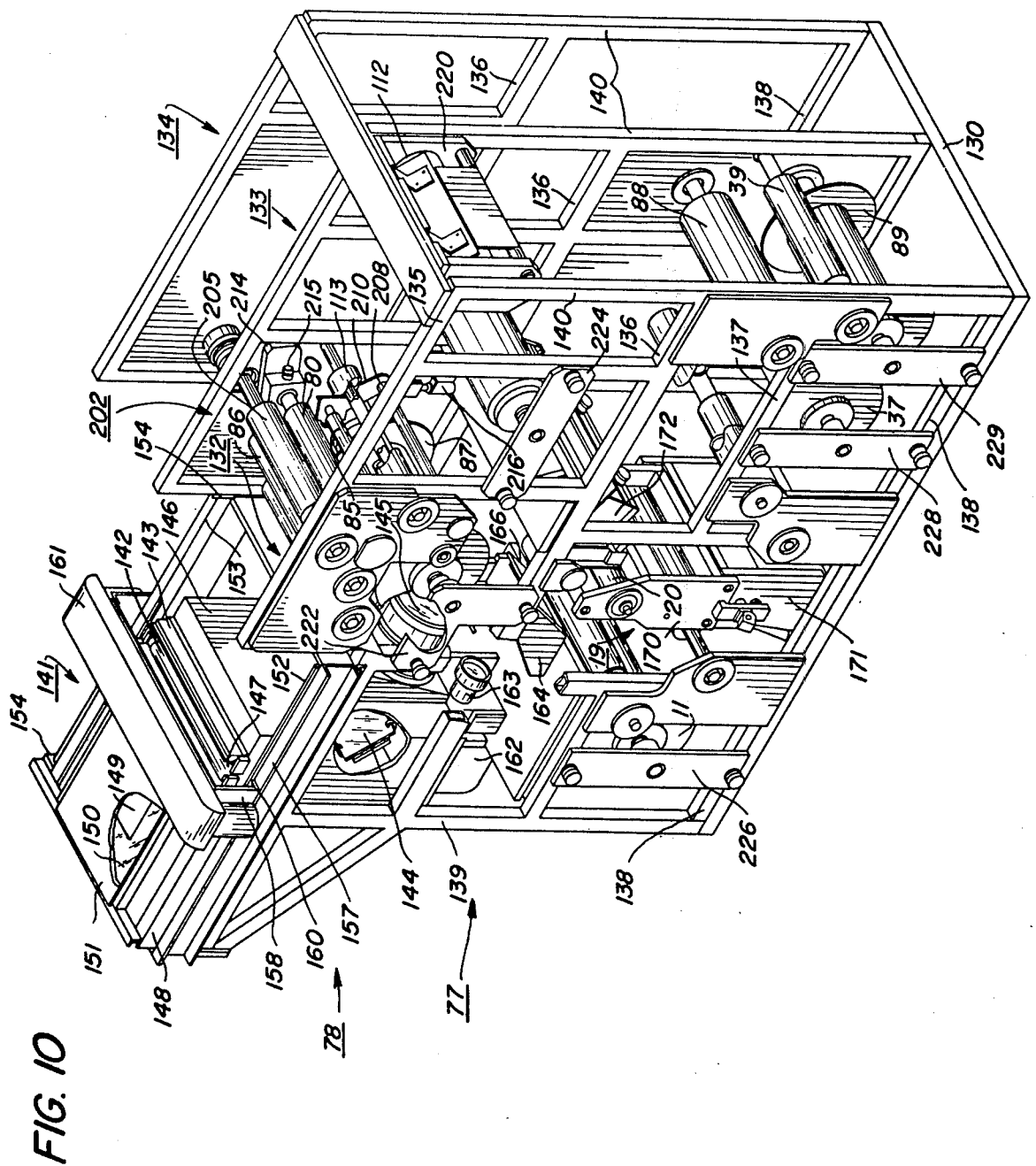
FIG. 10 shows a perspective front view of the overall web device photoelectrophoretic image machine.

FIG. 10 shows a perspective front view of the overall web device photoelectrophoretic imaging machine 1, according to this invention. The perspective drawing in FIG. 10 is not drawn to any exact scale, but is merely representative of the components and sub-assemblies comprising the web device photoelectrophoretic imaging machine designated as 1, and is generally representative of relative sizes.

The web device imaging machine sub-assemblies and components are mounted upon the base plate 130 between the front, center and rear members 132, 133 and 134 respectively. The frame members comprise vertical and horizontal bars that are adapted to support the various assemblies and components. The horizontal bars are generally divided into four levels or tiers 135, 136, 137 and 138. The vertical bars, which include the front end bars 139 and rear end bars 140, connect with the horizontal bars to divide the frame into mounting sections.

The opaque optical assembly 78 is mounted at the left end of the machine between frame members 132 and 133 and is used for opaque optical inputs. The opaque optical assembly 78 (reflection copy) includes the movable platen assembly, generally represented as 141, the lamp sources 142, the reflectors 143, the mirror assembly 144 and lens assembly 145. The mirror and lens assemblies are contained within the housing 146 that is provided with the opening or slit aperture 147 for slit scan exposure. The document to be reproduced is positioned on the movable platen 141 and exposed by the lamps 142 and reflectors 143. The lamps 142, which may be two in number, may take the form of metal halide arc lamps by General Electric Corporation. Alternatively, the lamps may be of the tungsten filament type. The light rays are directed through the aperture 147 to the imaging zone via the fixed mirror assembly 144 and through lens system 145.

The platen assembly 141 is transported by the main D.C. servo motor which will be described in more detail hereinlater, includes the carriage 148, which carries the document 149 to be reproduced on the surface of the recessed glass 150 underneath the cover 151. The platen carriage 148 is mounted for travel along the rails 152 and 153. The rail 152 is a square bar affixed on top of the side plate 157 and the rail 153 is formed on a cylindrical rod that is supported by brackets 154 at the ends. The front side member 158 contains the rollers 160, mounted at the front and rear ends for traverse along the rail 152. The heat sink 161 is positioned over the platen assembly above the lamp sources 142 to dissipate heat from the lamps. A bank of blowers may be positioned beneath the bottom of the platen assembly housing to further assist in the dissipation of heat produced by the lamps.

The transparency optical assembly 77 is also provided at the front end of the machine between the frame members 132 and 133 and between the horizontal levels 136 and 137. The transparency optical assembly comprises the transparency projector unit 162, lens assembly 162 and the mirror assembly 164. The mirror assembly includes the detachable upper and lower mirrors 165 and 166 respectively. To convert from transparent to opaque optical inputs, the upper mirror 165 is simply removed out of the optical path. The lamp source (not shown) contained within the projector unit 162 exposes a color transparency. Light rays of the original are projected to the imaging zone via the mirrors 165 and 166.

The inker assembly 19 may comprise the upper roller assembly 170 and the sub-base assembly 171. The sub-base assembly 171 is mounted on the frame member 138 and is releasably coupled to the upper roller assembly 170. The upper roller assembly 170 rotatably mounts the inking backup roller 20 that may also serve as a grounding roll for the conductive web in a manner to be described hereinlater.

The imaging assembly 172, which is described in great detail in the following paragraph, main support is provided on the horizontal bars 136 between the front and center frame members 132 and 133.

IMAGING ASSEMBLY

Figure 11:
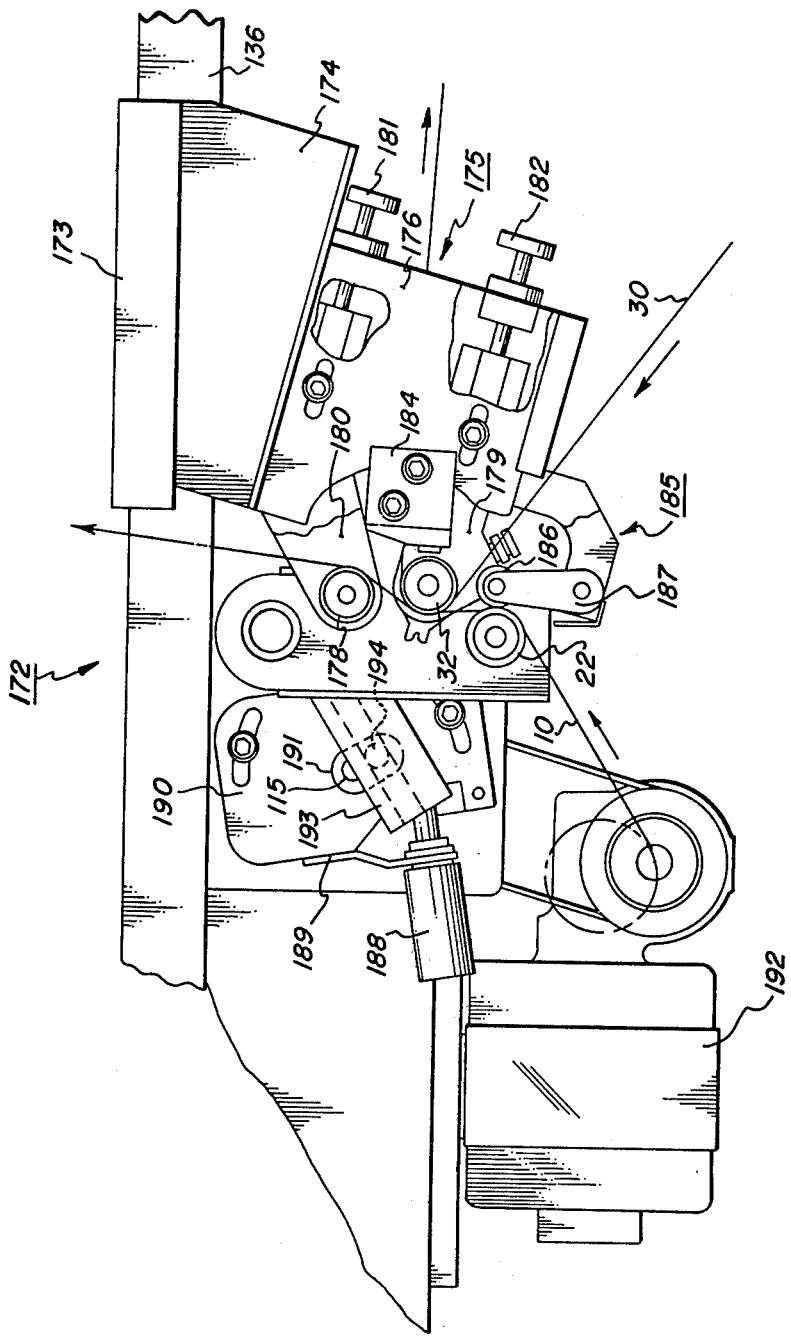
FIG. 11 is an elevation sectional, partially cutaway view of the imaging assembly.

Referring now to FIG. 11, there is shown a side elevation, partially cutaway view of the imaging assembly, generally represented at 172. The main support top plate 173 is connected to the machine frame on the horizonal bars 136. The main support assembly side plates 174 are attached to the bottom of the top plate 173 and connect with the roller support assembly 175. The roller support assembly 175 comprises the connecting side plates 176 that support upper idler roller assembly 178 on the arm supports 180. The side plates 176 also support the imaging roller assembly 32 on the arm supports 179. The roller support subassembly 175 further includes the upper idler roll knob adjust 182 and the image roll knob adjust 182. The upper idler roll knob adjust 182 is utilized to adjust the relative position of the upper idler roller 178 in a forward or rearward direction. Similarly, the image roll knob adjust 182 is used to position the image roller 32 forward or rearward. The adjustment knobs 181 and 182 are, thus, utilized to position the image roller 32 and the upper idler roller 178 and thereby set the imaging gap and wrap angle between the conductive web 10 and blocking web 30. The roller support side plates 176 are further provided with the stop blocks 184 which function to limit the image roller movement in one direction and thereby the amount of wrap angle achieved by the conductive and blocking webs at the imaging zone.

Still referring to FIG. 11, the imaging assembly (although optional) may include the ground roll subassembly 185, which includes the grounding rolls 186 rotatably mounted on the holders 187 to provide the electrical ground connection to the conductive web 10 during an imaging sequence. The grounding rolls 186 may be three spaced apart rollers positioned to contact the conductive web at the edges and at the center of the web. The conductive-blocking web separator system, which will be described later, includes the solenoid 188 mounted by the bracket 189 to the clutch-bearing housing 190. The solenoid 188 actuates the motor 192 that drives the cam 191 shaft 115 through a drive belt, pulleys and clutch means which are not shown for purposes of clarity. The cam guide 193 is used to provide a path for the cam follower 194.

Figure 12:
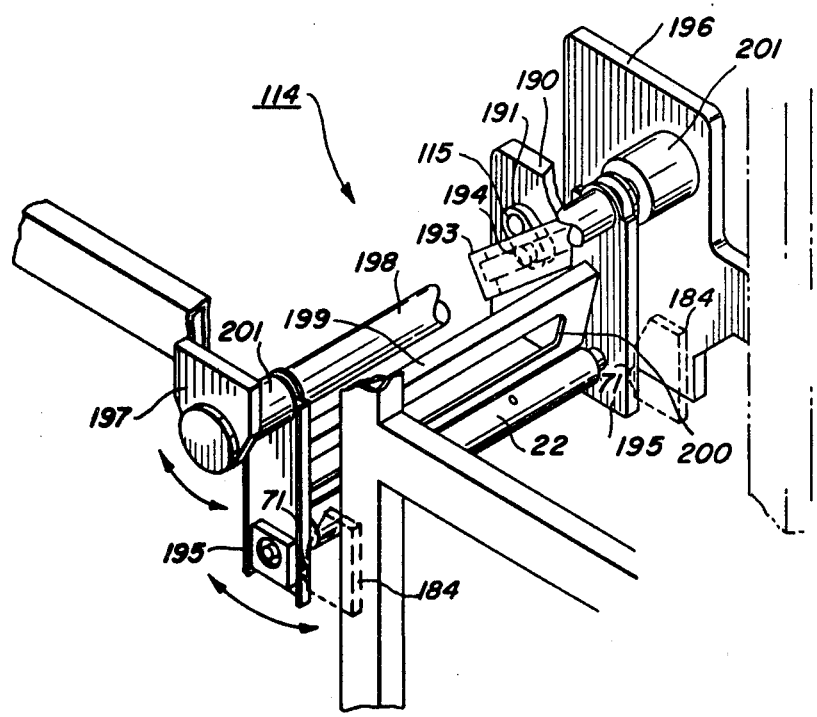
FIG. 12 is an isolated perspective view of a portion of the conductive-blocking web separator system.

Turning now to the FIG. 12, there is shown an isolated perspective view of a portion of the conductive-blocking web separator system 114 according to the instant invention. The conductive-blocking web separator system, represented as 114, is used to control accumulation of excess liquid, if any, at the entrance to the nip or the imaging zone.

As will be recalled, when the conductive web and blocking web are brought together at the imgaging zone to form the ink-web sandwich, the uniform electrical field and the forces exerted by tension at the conductive web may tend to cause excess ink and oil to be uniformly metered out of the sandwich forming an electrical bead at the imaging nip. This liquid bead will remain in the entrance after the coated portion of the conductive web is passed and then gradually dissipate through the nip. If a portion of the bead remains in the nip inlet until subsequent ink film arrives, it will mix with this ink film and tend to degrade the quality of subsequent images to be formed.

In order to dissipate or eliminate the liquid bead, the conductive web is displaced intermittently by the conductive-blocking web separator mechanism 114, so as to reduce the wrap of the conductive web to at least 0° or to disengage the conductive web from contact with the blocking web. When the separator roller 22 is actuated to move upward to the standby position, the webs are separated and the excess liquid bead is allowed to be passed out of the nip and carried away by web portions not to be imaged. After the bead has completely passed the imaging zone, the separator roller 22 is again actuated to return the roller to the image position, and hence, the conductive web and blocking web into contact for the next successive image.

Still referring to the FIG. 12, the web separator roll 22 is mounted between the pivot arms 195. The pivot arms 195 are connected to the pivot roll 198 that is supported between front support plate 197 and rear support plate 196 via bearing blocks 201. The cam 191 which is driven by the separator motor through suitable pulley, timing belt and clutch means (not shown for purposes of clarity) is provided with the cam follower 194. The cam follower 194 is coupled to the cam guide 193 and interacts with the guide to move the pivot arms 195 in a reciprocating motion indicated by the arrow. The arms 195 are provided with the stop bottoms 71 that engage the stop blocks 184 carried on the imaging roller side plates referred to hereinearlier.

The optical slit guide 199, attached between the pivot arms 195, is used to direct light rays from the optical input to the imaging zone via the slit 200. The slit guide 199 may be formed of metal material with a black oxide finish.

TRANSFER ASSEMBLY

Referring again to FIG. 10, the transfer assembly, generally represented by 202, includes the transfer roller 80, drive roller 205, idler roller 113 and the conductive-transfer web separator roller 85, supported by the front mounting plate 203. The web separator roller 85 is part of the conductive-transfer web separator mechanism used to control excess liquid accumulation at the entrance to the transfer zone or nip.

The image on the conductive web approaching the transfer zone, may include oil and pigment outside the actual copy format area, including an excess bead of oil at the trailing edge. The conductive-transfer web separator system is used to separate the paper web from contact with the conductive web, briefly after the transfer step to allow excess oil and pigment between them to clear the transfer zone. The transfer separator solenoid 216 receives an acutating signal from a cam switch (not shown) causing the separator pivot rod 208, carried by the arm 210, to pivot. This moves the separator roller 85 to the transfer position bringing the webs into contact at the transfer roller 80. As seen in FIG. 1, when the separator roller 85 moves into the transfer position, the grounding rolls 212 contact the conductive web surface to provide the electrical ground connection to the conductive web 10 during the transfer sequence. The grounding rolls 212 are spaced apart rollers positioned to contact the conductive web at the outer edges. The grounding rollers may comprise two grounding rolls positioned such that the center line for the grounding rolls is about 1.250 inches beyond the edge of the blocking web. When a second actuation signal is received from a cam switch, the separator roller 85 is returned to the standby position separating the paper web from contact with the conductive web and the excess liquid bead remains on the conductive web by the action of the conductive-transfer web separator system. The separator roller 85 is now in position for the next successive transfer step.

Still referring to FIG. 10, the conductive web supply roll 11 is releasably mounted by the removable plate 226. The conductive web takeup roll 87 is mounted by the removable plate 222 to the machine frame member. The blocking web supply roll is mounted by the removable plate 228 and the blocking web takeup roll is mounted by removable plate 229. The paper web supply roll 110 is releasably mounted by the removable plate 224. After the transferred image is fixed, the paper web is guided by the electrostatic capstan 112 to the triming station 220 mounted by a tie bar at end members 140. Upon the completion of the transfer process, the final copy may be cut to the desired length by a paper cutter at the triming station, or copies may be allowed to run completely out of the machine.

With the imaging and transfer separator systems operating in the above manner, all ink and excess oil is kept on the webs themselves, therefore, no cleaning of machine elements is required. The machine arrangement beyond transfer accounts for any bead of oil that is allowed to pass the transfer zone. When the machine is stopped after a copy run, this bead from the last copy must be prevented from running back along the conductive web and interferring with subsequent copies.

Figure 10A:
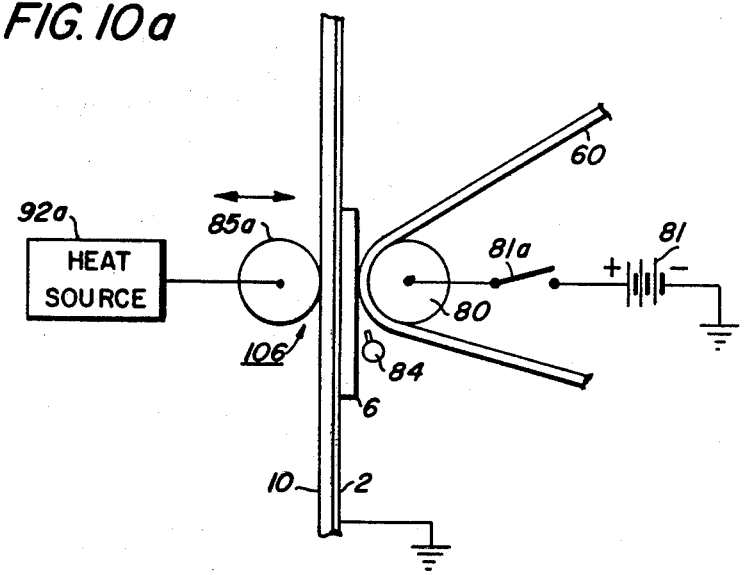
FIG. 10a is a side view, partially schematic diagram of one preferred embodiment for transferring and fixing in one step.

Referring now to FIG. 10a, there is shown a side view, partially schematic diagram of one preferred embodiment for transferring and fixing in one step. In this exemplary example, the paper transfer web 60 may take the form of polyamide coated paper. When polyamide coated paper is used as the paper web 60, photoelectrophoretic imaging machines employing the disposable web configuration may be further simplified. In such case, the transfer and fixing steps may be accomplished in one step by bringing the conductive web into contact with the polyamide coated paper web 60 at the transfer zone 106 between two rollers and applying heat and pressure. The pressure roller 85a moves under force in the direction of the arrow to bring the webs into contact at the transfer zone 106, the image 6 sandwiched between the two webs. The pressure roller 85a is coupled to the heat source 92a. This results in a substantially complete transfer of all pigment particles from the conductive web 10 to the polyamide coated paper web 60 and the image is fixed simultaneously.

In still another alternative embodiment, an electric field may be applied during the application of heat and pressure. In this case, the switch 81a is used to couple the voltage source 81 to the transfer roller 80.

Figure 13:
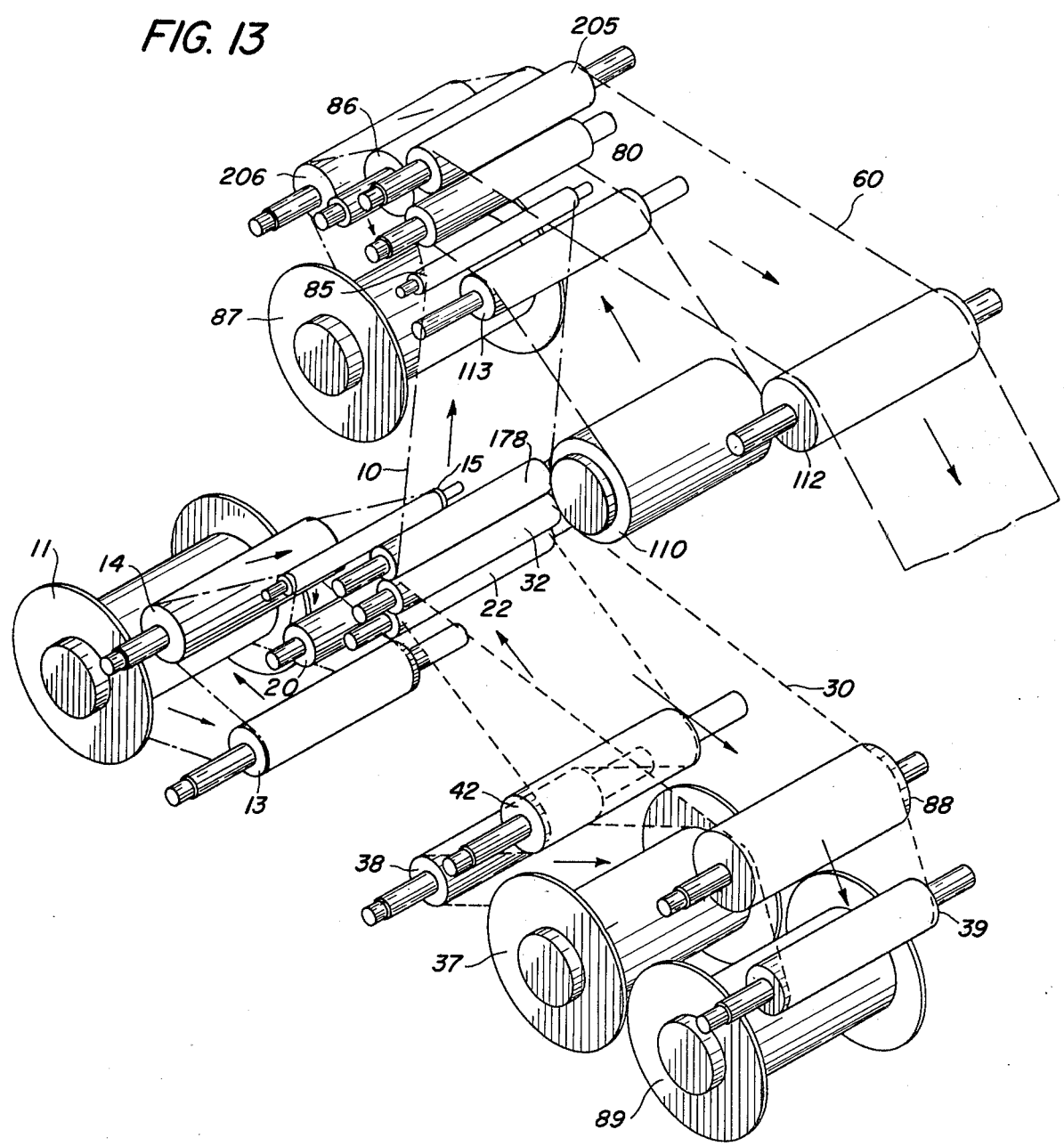
FIG. 13 is a perspective view showing the web interfacing relationships and travel paths.

The FIG. 13 is a perspective view showing the interfacing relationship and travel paths of the conductive, blocking and transfer webs in the machine, according to this invention, as set forth hereinabove. The conductive supply roll 11 and takeup roll 87 may be provided with flanged members to edge guide web material onto the rolls. The blocking web supply roll 37 and takeup roll 89 is likewise provided with flange members to edge guide the blocking web 30 onto the rolls. The conductive web 10 is driven into interface with the blocking web 30 at the imaging roller 32. The blocking web 30 is driven from the imaging roller 32 to the takeup roll 89 and rewound onto the roll. The conductive web 10 is driven from the imaging roller 32 into interface with the transfer or paper web 60 at the transfer roller 80. The transfer web is driven from the transfer supply roll 110 to the transfer roller 80, around the drive roller 205 and takeup capstan roller 112 and out of the machine. The conductive web 10, in one embodiment, is driven from transfer roller 80 around the drive capstan roller 86 and takeup roller 206 onto the takeup roll 87 and is rewound.

MACHINE WEB TRANSPORT SYSTEM

Figure 14:
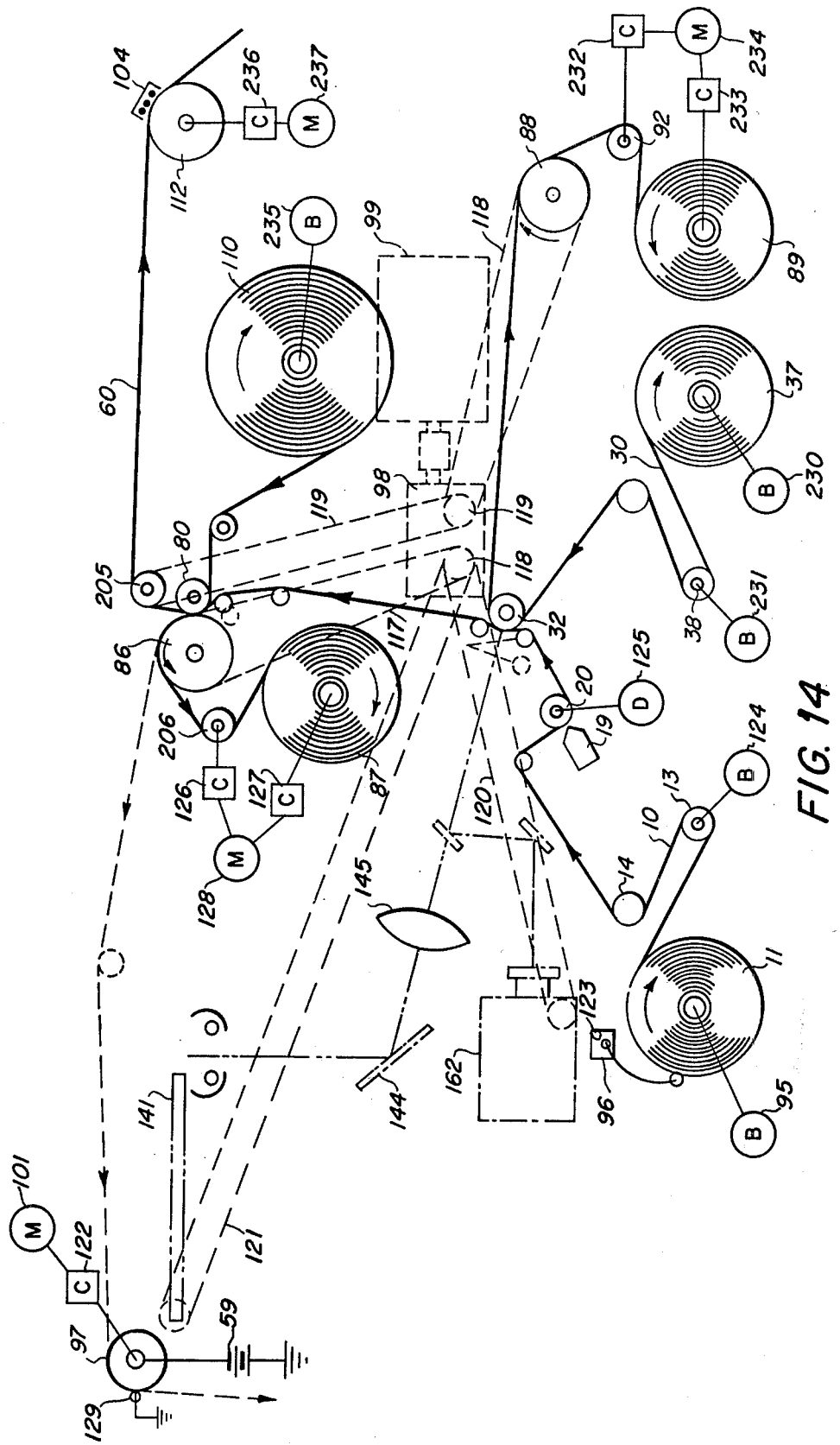
FIG. 14 is a simplified, side view partially schematic diagram of the machine web transport system and web travel paths.

Turning now to FIG. 14, there is shown a simplified side view, partially schematic diagram of the machine web transport system (and web travel paths) according to this invention. The web transport system maintains the conductive and blocking webs at balanced and constant tension levels over a wide tension range. The capstan drive rollers for each of the three webs (conductive, blocking and transfer webs) is driven by the same D.C. drive motor 99 through the main drive gear box 98. The gear box 98 is provided with dual output shafts 118 and 119 that drive the conductive drive roll 86, blocking drive 88 and transfer drive roll 205 in the proper direction via the timing belts 117, 118 and 119, respectively. The timing cam switch and scan drives for the opaque movable platen 141 and the transparency projector 162 are driven by the motor 99 through the shaft 118 via the timing belts 120 and 121, respectively.

The conductive web 10 driven by the drive roll 86, can be rewound on the takeup roll 87 for disposal. Alternatively, the image in the conductive web can be saved or examined by transporting the web out of the machine via the electrostatic capstan roller 97 driven through the hysteresis clutch 112 by the A.C. motor and gear box 101.

Constant tension levels for the conductive web supply roll 11 is provided by the electromagnetic brake 95. The torque for the hysteresis brake 95 is controlled by feedback from the radius sensor means 96 that engages the supply roll surface diameter. The radius sensor 96 drives the variable potentiometer 123 which varies the current flow to the brake 95 as the roll diameter changes thereby maintaining the conductive web tension level constant while unwinding from the supply roll 11.

The conductive web 10 is driven from the supply roll 11 to the friction capstan roller 13. The friction roller 13 is coupled to the hysteresis brake 124 which is similar to the brake 95, but is set at a constant torque level. From the friction roller 13, the conductive web is transported to the inking backup roller 20 that is connected to the machine frame through the viscous damper 125 on the roller shaft. The total tension on the conductive web at the imaging roller 32 is the sum of the brake forces applied at rollers 11, 13 and 20, which optimally are maintained at about 2.5 lbs./inch of web width.

The conductive web 10 is driven from the imaging roller 32, past the transfer roller 80, passing around the drive roller 86 and takeup capstan roller 206 to the conductive web takeup roll 87. The takeup capstan roller 206 and takeup roll 87 provide tension to the conductive web 10 by means of the hysteresis type clutches 126 and 127, respectively, which are overdriven by the A.C. motor and gear box 128. The torque for the clutch 126 at capstan 206 is set at a constant level. The variable torque at the rewind roll 87 is controlled by a radius sensor and variable potentiometer in the same manner as described hereinearlier with regard to the conductive web supply roll.

Where the alternative tensioning system for retaining the image on the conductive web is employed, the electrostatic capstan roller 97 is utilized. Constant torque is maintained on the roller 97 by the A.C. motor and gear box 101 overdriving the hysteresis type clutch 122. Constant tension is maintained on the conductive web 10 by providing an electrostatic tacking force between the roller and web. The conductive side of the web 10 is grounded at 129 and a pulse voltage 59 is applied to the roller 97 to tack the web to the roller.

The blocking web tensioning control system is similar to the system used for the conductive web. The blocking web supply roll 37 and friction capstan roller 38 are provided with the hysteresis type brakes 230 and 231, respectively, to provide the braking force to the blocking web 30. The tension at the supply roll 37 and the takeup roll 89 is maintained at constant levels by feedback from radius sensors, that engage the roll surface diameter, to control the brake and clutch current and torque output. The takeup capstan roller 92 and takeup roll 89 provide tension to the blocking web 30 by means of the hysteresis type clutches 232 and 233, respectively, which are overdriven by the A.C. motor and gear box 234. The takeup tension at the takeup rollers 92 and 89 is very closely balanced with the braking tension level at the blocking web supply roll 37 and friction roller 38. With balanced tension levels for the takeup and braking tension, only a small amount of force is required to move the blocking web 30.

The paper web 60 tension is maintained in a balanced condition. The paper or transfer supply roll 110 is braked by the hysteresis type brake 235 that is current controlled from a variable potentiometer on a radius sensor in the manner described with regard to the conductive web supply roll 11. The takeup tension for the paper web 60 is supplied through the electrostatic takeout capstan roller 112 by means of the hysteresis clutch 236 that is overdriven by the A.C. motor and gear box 237. Torque at the takeout capstan roller 112 is controlled at a constant level. The paper web 60 is electrostatically tacked to the grounded roller 112 by charge from the D.C. corotron 104.

The traveling velocity for the three webs is provided by the common servo controlled D.C. motor 99 through the dual shaft output gear box 98 that also drives the timing cam switch and scan drives for the transparency projector unit 162 and opaque platen assembly 141. The cam switch and scan drives for the transparency unit 162, platen assembly 141 and the drive rollers 86, 88 and 205 are connected to the main drive through electromagnetic clutches for individual control. When the machine is turned on, power is supplied to the brakes, clutches and takeup drive motors and tension is applied to the three webs. The main drive motor 99 is also turned on.

When an image cycle is started, the electromagnetic clutch (electromagnetic clutches on drive rollers not shown) on the the conductive web drive roller 86 is engaged, the conductive web 10 accelerates to the desired velocity, and inkling begins. The conductive web 10 is in contact with the blocking web 30 at the imaging roller 32 and is driving the blocking web through contact at the image roller during startup and inking. After completion of the imaging step, the conductive and blocking webs are separated and the electromagnetic clutch to the blocking web drive roller 88 is engaged if the machine is in multiple cycle mode until the blocking web 30 and conductive web 10 come back into contact at the imaging roller 32. As the image on the conductive web 10 approaches the transfer roller 80, the electromagnetic clutch on the paper web drive roller 205 is engaged and the paper web 60 is accelerated to approximately the same velocity as that of the conductive web. After the conductive web 10 is brought into contact with the paper web 60 at the transfer roller 80, the electromagnetic clutch to the paper web drive roller 205 disengages and the paper web 60 is driven by the conductive web through contact at the transfer roll. When transfer is complete, the electromagnetic clutch at the transfer web drive roller 205 is again engaged and the webs are separated. After the ink residue, if any, has cleared the transfer zone, the electromagnetic clutch for the conductive web drive roller 86 is disengaged, stopping the conductive web 10. The paper web 60 continues to be driven, through a time delay mechanism (not shown), until the transferred image is out of the machine.

Figure 14A:
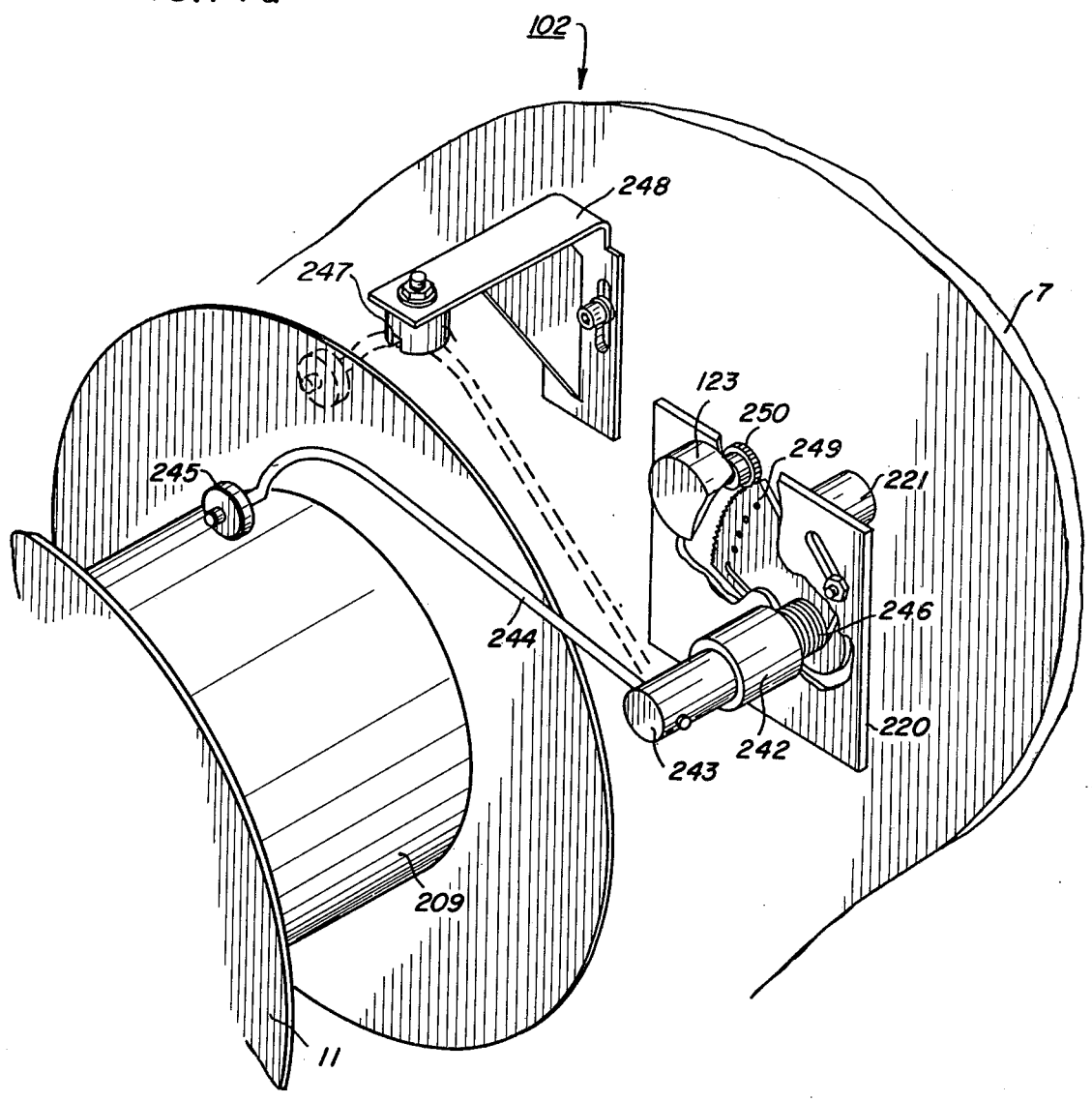
FIG. 14a is a perspective isolated view of the roller radius sensor.

FIG. 14a shows a perspective isolated view of the radius sensor generally represented as 102. The radius sensor rides on the roll diameter 209 and controls the potentiometer 123 which changes the current flow to the brake 95 (see FIG. 14) as the roll radius changes. The radius sensor mounting plate 220, mounted to frame 7 by the mounting post 221, carries the bearing housing 242 and hub 243. The radius arm 244 which may be formed of mild steel, is connected to the potentiometer 123 via the hub 243. The roller 245, constructed of an insulating material such as Delrin, acetal resin (polyacetal), is rotatably mounted on the arm 244 and is urged into pressure engagement with the web diameter by the coil 246. The magnetic button 247, carried on the bracket 248 is situated to attract the conductive arm 244 as indicated by dotted outline. The displacement of the arm 244 is transmitted via the segment gear 249 and spur 250 to the potentiometer 123.

Figure 14B:
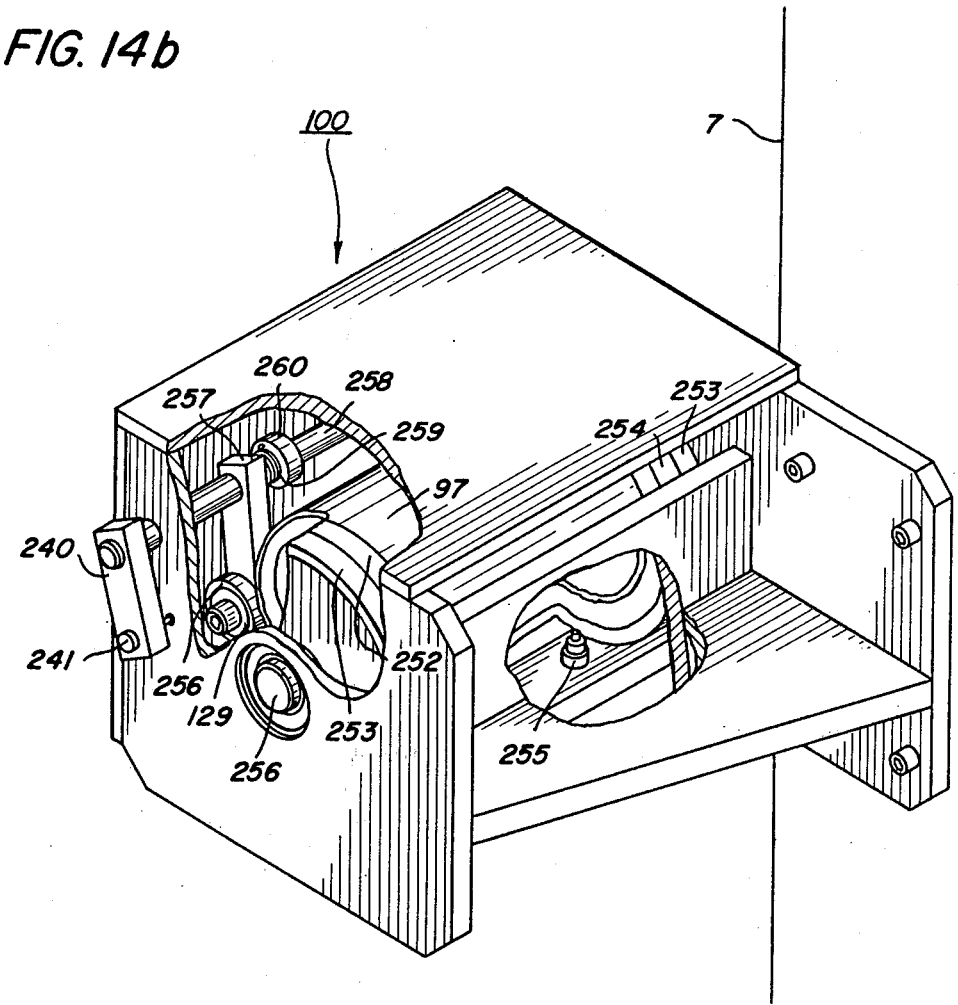
FIG. 14b is an isolated perspective view of the conductive takeout capstan assembly.

Turning now to FIG. 14b, there is shown an isolated, partially cutaway, perspective view of an alternative tensioning device 100 for the conductive web which permits the conductive web to be saved rather than rewound. In the FIG. 14b embodiment, the takeup roller 87 is replaced by the tensioning device 100. The tensioning device electrostatic capstan drive roller 97 driven by the torque motor 101 (see FIG. 14) set at constant torque. Tension is supplied to the conductive web 10 from the roller 97 via electrostatic tacking force between the roller and web. This is achieved by grounding the conductive side of the web 10 which is not in contact with the roller 97 and applying a pulsed D.C. voltage to the roller (see FIG. 14).

A high voltage is applied intermittently to the electrostatic capstan roller 97 causing the web 10 to tack to the capstan roller 97 with an appreciable normal electrostatic force. This will allow appreciable tension to be applied to the conductive web 10.

The voltage is pulsed to roller 97 at a suitable frequency to avoid nip entrance breakdown on approximately 50% of the area that the conductive web 10 makes contact with the capstan roller 97, since tacking will not take place in the area which has passed through the entrance to the nip while the high voltage is on.

The roller 97 may be constructed of metal and is provided with the insulator sleeves 252 and end caps 253 on the ends of the roller. The inside end of roller 97 is provided with the conductive metal sleeve 254 that is coupled to ground by the brush assembly 255. The roller shaft 256 is keyed to suitable pulley means which is driven by the constant torque motor. The contact rollers 129, that are covered by the conductive rings 256, which may be neoprene, polychoroprene $(C_4H_7Cl)_n$, are rotatably mounted by the arms 257. The arms 257 and conductive covered rollers 129 are carried by the shaft 258. The rollers 129 are maintained in contact with the capstan roller 97 and conductive web contained thereon by the torsion springs 259 and collars 260. The lever 240 provided with the spring plunger 241 may be used to adjust the contact pressure. The rollers 129 are used to couple web 10 to an electrical bias.

BIASING THE CONDUCTIVE WEB

Referring now to FIG. 15, there is seen an elevation, sectional view of one embodiment of the method of biasing the conductive web. As will be recalled, the conductive web 10 is grounded (or electrically biased) during both the imaging and transfer process steps. The grounding rollers 301, situated adjacent the backup roll 302, may be provided just prior to the imaging and transfer zones. In this case, the grounding rollers or contact brushes 301 engage the conductive surface 2 outside the inked or image format area. The brushes 301 are mounted to engage the web surface by support rods 303 that are maintained by the ground blocks 304. The ground blocks 304 are attached to the brackets 305 that connect to the machine frame.

The grounding rollers 301 and backup roll 302 may be positioned at a location in advance of the inking station to ground the conductive web 10 during the imaging sequence. Alternatively, the roll 302 may be coupled to ground (or some other idler roller in the web path), may be placed against the conductive side of the conductive web before the inking station. In this case, there woiuld be no need for the grounding rollers 301. Also, the grounding rollers and backup roll may be employed in the same manner outside the transfer zone to ground the conductive web 10 during transfer.

Referring now to FIG. 16, there is shown an elevation, sectional view of the combination biasing and imaging roller 320 according to this invention. In some instances, it may be desirable to minimize the total resistance of the conductive web to ground. In this regard, the combination biasing and imaging roller 320 is utilized to shorten the path to ground to approximately ¼ inch and thereby provide an excellent ground close to the imaging zone.

The roller 320 is provided with the insulator rings 321 concentric with the roller shaft 322. The shaft 322 is coupled to the electrical potential source 323 used to supply the high imaging voltage to the image roller core. The image roller 320 may be formed of any conductive material, preferably non-magnetic stainless steel. The roller is provided with the machined grooves 324. The blocking web 30 extends to the center of the insulators 320. The conductive web 10 extends beyond the edges of the blocking web to the metal end sleeves 325. The conductive web surface 2 contacts the metal sleeves which are grounded by the brushes 326 mounted on the rods 327 carried with the blocks 328.

While the imaging roller 320 is shown as a roller, in some instances it may also take the form of an arcuate type device formed of conductive material including conductive rubber.

THE ELECTRICAL POWER CONTROL

Figure 17:
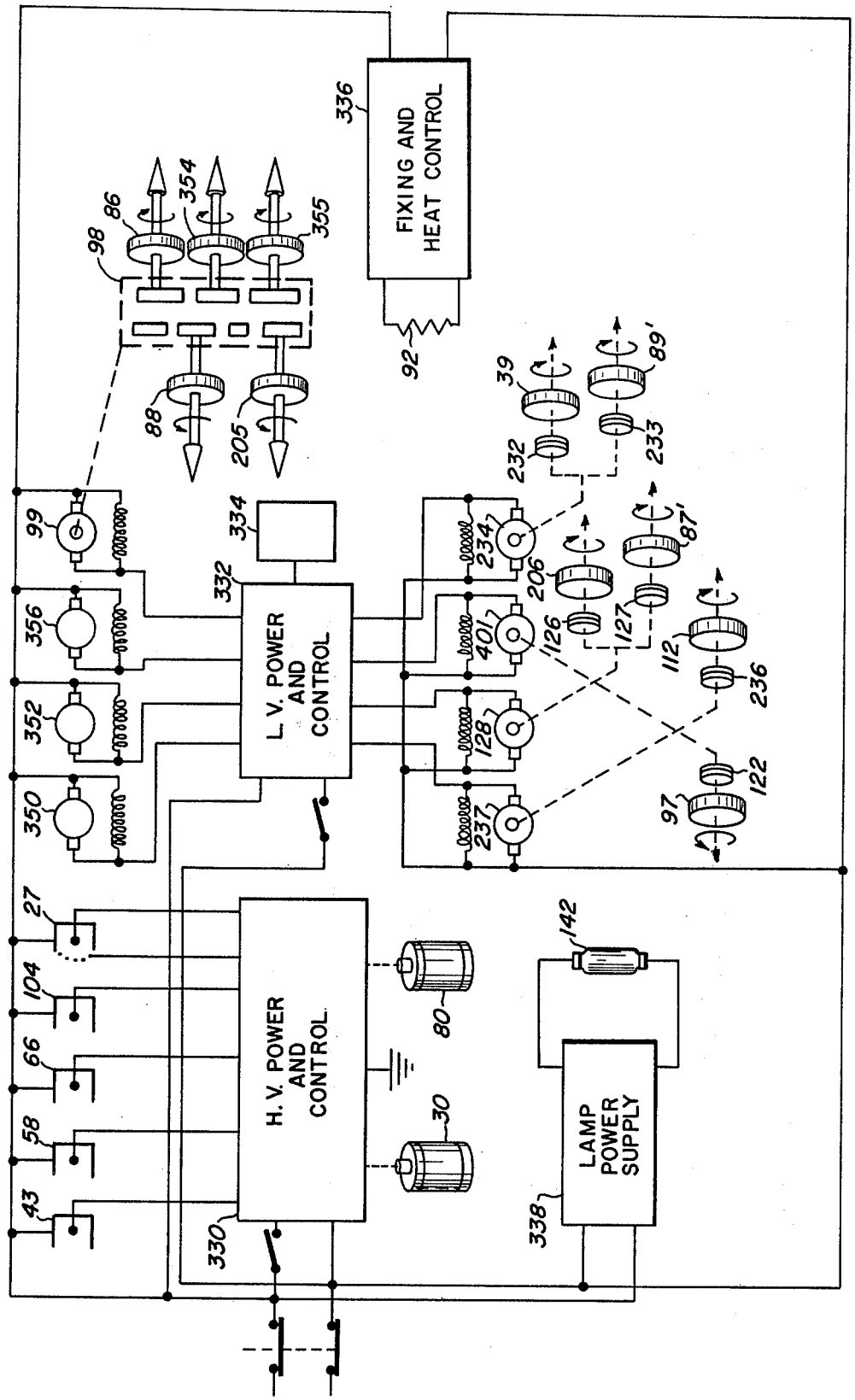
FIG. 17 shows a simplified block and partial schematic diagram of the machine electrical control system.

Referring now to FIG. 17, there is shown a simplified block and partial schematic diagram of the electrical circuit for power distribution for the photoelectrophoretic web device imaging machine.

The electrical power requirements of the photoelectrophoretic web device machine consists essentially of four types. They include the high voltage power and control 330, the low voltage power and control 332, the lamp power supply 338 and the fixing and heat control power supply 336.

The high voltage power control 330 is used to supply power for the four corotrons 43, 58, 66 and 104 and the scorotron 27. The photoelectrophoretic web device machine also calls for high D.C. voltages at the imaging roller 32 and the transfer roller 80. These voltages may be produced at the common power source 330 which has a shared converter system with regulation for each output.

The low voltage power and control 332 is used to supply power for the servo system, the logic system 334 and fixed speed A.C. motors which all require this type of power supply. The low voltage power and control 332 also supplies power for the inking motor and clutch 350, the image separator motor 352, the transfer separator motor 356 and the D.C. drive motor 99 and gear box 98. As will be recalled, the gear box 98 is provided with dual output shafts that drive the conductive drive roll 86, blocking drive 88 and transfer drive roll 205 via timing belts. The gear box 98 also drives the platen scan drive 354 and the transparency projector drive 355. The low voltage power and control 332 supplies power to the motor 237 which drives the capstan roller 112 through the clutch 236. Likewise, the power and control 332 supplies power to the motor 101 which drives the electrostatic capstan 97 through the clutch 122. The low voltage power and control 332 is also used to supply power to the takeup motors 128 and 234. The conductive takeup motor 128 is coupled to the conductive takeup capstan 206 and the conductive takeup roller shaft 87' via clutches 126 and 127 respectively. The motor 234 is coupled to the blocking web takeup capstan 39 and the blocking takeup roller shaft 89 via the clutches 232 and 233 respectively.

The lamp power supply 338 supplies the power to the lamp source 142. A complete and detailed description of one example for the power supply 338 electrical circuit is found in copending U.S. application Ser. No. 416,921, filed Nov. 19, 1973, by Douglas E. Webb and Russell G. Schroeder, II.

The fixing and heat control power supply 336 is used to supply power for the fixing station 92.

THE MECHANISM FOR INCREASING FORCE FRICTION BETWEEN WEBS

Figure 18:
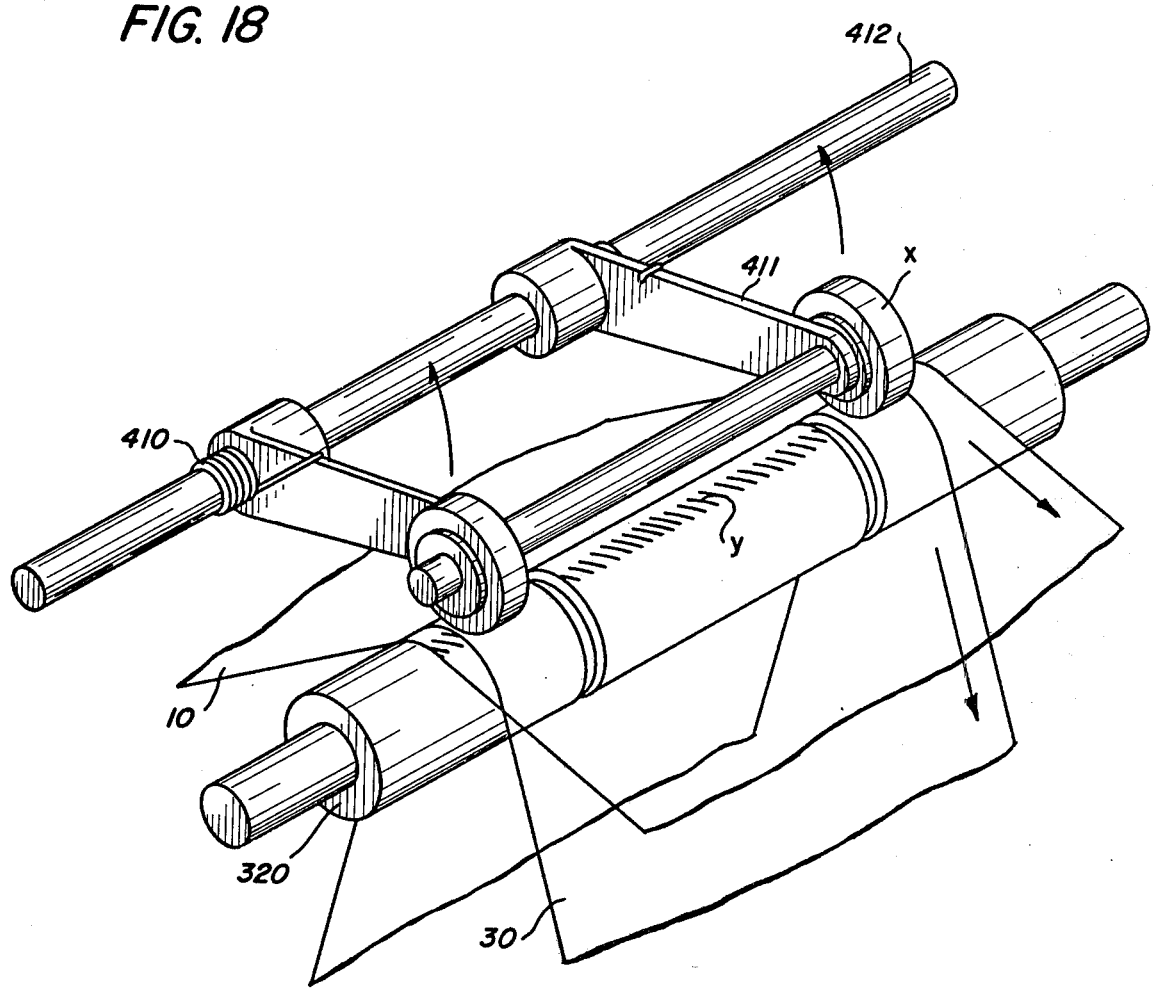
FIG. 18 is a perspective isolated view of a preferred embodiment for increasing friction force between two webs.

Referring now to FIG. 18, there is shown a perspective isolated view of the mechanism used for increasing the force friction between thin webs at the image and transfer rollers in the photoelectrophoretic web device imaging machines.

The photoelectrophoretic process is particularly sensitive to any relative motion between webs during the imaging and transfer steps. The photoelectrophoretic ink sandwiched between the webs at the imaging roller and the formed image at the transfer roller acts as a lubricant and tends to reduce the friction force between the webs to near zero. Therefore, extra web width is provided to allow for a small dry area on each side of the image or transfer zone whereat one web can exert a friction force on the other web without slip. The force, however, may be limited by the geometry of the nip and the web tension requirements of the process which control the normal force between the webs.

In order to increase the friction force at the dry area on either side of the image or transfer zone the spring loaded pressure wheels or rolls X are provided to ride against the ink-web or image-web sandwich and the roller in the dry area on either or both sides of the image or transfer zone y.

The spring 410 provides a normal force of about 5 pounds to the pressure rolls X against the web sandwich. The pressure rolls X are carried on the arms 411 that are keyed to the shaft 412. The shaft 412 rotates in the direction of the arrow in order for the pressure rolls X to be lifted in the direction of the arrows during web separation.

IN OPERATION

The sequence of operation of the web device photoelectrophoretic imaging machine is as follows:

At standby, the conductive web supply roll, adequate for the desired number of copies, is provided. The conductive web supply is braked by the hysteresis brake controlled by a radius sensor for constant tension in the web coming off the supply roll. The blocking web supply, adequate for the desired copies to be made, is provided. Constant tension for the blocking web supply roll is provided by hysteresis brake controlled by a radius sensor in the same manner as for the conductive web. The transfer web supply roll, sufficient for the desired number of copies, is provided. The paper supply roll is braked by a hysteresis brake controlled by feedback current from radius sensor means to maintain constant tension at the paper web supply roll.

The conductive web takeup roll is driven by an A.C. motor and gear box overdriving a hysteresis clutch. The paper web takup capstan is also driven by the same A.C. motor and gear box overdriving a hysteresis clutch.

When the power is turned on initially, power is supplied to the main drive motor, brakes, clutches and three web takeup drive motors and tension is applied to the webs. At the start of the photoelectrophoretic imaging process, the electromagnetic clutch on the conductive web drive roll is engaged and the web is accelerated to the desired imaging velocity. The inker starts applying ink film to the conductive web surface of the desired ink film thickness and length. When the conductive web reaches the precharge station, the deposition scorotron applies the precharge voltage to the ink film. The amount of potential to be applied by the scorotron will depend upon the characteristics of the photoelectrophoretic ink used in the system. When photoelectrophoretic imaging suspension of particular properties are used, the scorotron applies a high charge resulting in total pigment deposition. When photoelectrophoretic ink having other properties is used, a slightly lower charge is applied by the scorotron and will not result in total pigment deposition.

The blocking web is subjected to the corotron high voltage just prior to entering the imaging zone to assure against stray fields. During the startup and inking step, the conductive web is in contact with the blocking web and is driving the blocking web through contact at the imaging roller. The imaging voltage is then applied to the imaging roller as the ink film passes over the imaging roller while the scanning optical image, from either the transparency or opaque optical input system, is projected to the imaging zone. The imaging voltage may be ramped by programming means to allow the voltage to be raised up to the desired operation level while the imaging entrance nip is being filled with liquids. After completion of the imaging step, the webs are separated by the conductive-blocking web separator mechanism and the electromagnetic clutch to the blocking web drive roller is engaged until the webs are brought back into contact at the imaging roller when in the multiple cycle mode. During the period when the webs are separated out of contact by the conductive-blocking web separator mechanism, the liquid bead buildup at the entrance nip is passed through the imaging zone by the conductive web.

After the imaging step and development takes place, the formed image on the conductive web may be discharged and then recharged by the pigment corotrons. Alternatively, depending upon the characteristics of the ink used, the discharge step may be omitted and the ink film is recharged only. When the leading edge of the photoelectrophoretic image on the conductive web approaches the transfer zone, the electromagnetic clutch on the paper web drive roll is engaged and the paper web is accelerated to approximately the same velocity as that of the conductive web. The conductive-transfer web separator mechanism is actuated to bring the conductive web into contact with the paper web at the transfer roller. After the conductive web is brought into contact with the paper web at the transfer roller, the clutch to the paper web drive roller disengages and the paper web is driven by the conductive web through contact at the transfer roller.

Prior to the transfer step, the fluid injecting device provided at the transfer zone entrance, is used to apply air breakdown reducing medium into the transfer nip before transfer in order to eliminate air breakdown defects. A fluid injecting device may also be provided at the entrance nip to the imaging zone and the air breakdown reducing medium applied to the imaging nip prior to the imaging step.

The conductive web rewind spool may be replaced by the electrostatic capstan for use when saving the image on the conductive web. The electrostatic capstan is driven by hysteresis clutch overdriven by an A.C. motor and gear box set at constant torque. The conductive surface of the web is grounded and a pulse voltage is applied to the capstan roller to tack the web to the roller.

When the transfer step is completed, the conductive-transfer web separator mechanism is actuated and the conductive and the paper webs separate briefly. This will allow liquid bead that may accumulate at the entrance nip to pass out of the transfer zone. Also, the clutch at the transfer web drive roller is again engaged. After the ink residue has cleared, the transfer zone, the conductive web drive roller is disengaged, stopping the conductive web. The paper web continues to be driven through a time delay relay until the transferred image is out of the machine. The transferred image on the paper web is transported to the fixing station to fuse the image and to the paper chute. A triming station may be provided to trim the copy to the desired size.

The above sequence steps are repeated for multiple copies.

Other modifications of the above described invention will become apparent to those skilled in the art and are intended to be incorporated herein.

What is claimed is:

1. A web tension system comprising in combination:
    a. a web supply roll mounted to support a conductive web for travel, said web supply roll provided with tension means for controlling web tension of a supported conductive web unwinding from said web supply roll;
    b. a web drive capstan roller for driving a supported conductive web through friction contact therewith at constant velocity;
    c. a web friction capstan roller mounted in the direction of web travel after said web supply roll, said web friction capstan roller provided with tension means for controlling tension of a supported conductive web unwinding from said web supply roll in cooperation with said web supply roll tension means in (a) above;
    d. main drive means for driving said web drive capstan roller at the desired speed;
    e. an electrostatic capstan roller mounted to transport a supported conductive web unwinding from said web supply said electrostatic capstan roller provided with electrostatic roll, electrostatic tacking means for providing an electrostatic tacking force between a supported conductive web and said electrostatic capstan roller and thereby controlling tension of a supported conductive web transported from said web supply roll; and
    f. electrostatic drive means for driving said electrostatic capstan roller at the desired speed.

2. The apparatus according to claim 1 wherein said main drive means comprises an A.C. servo motor and gear box.

3. The apparatus according to claim 2 wherein said electrostatic mrive means comprises an A.C. motor and gear box overdriving a hysteresis type clutch.

4. The apparatus according to claim 3 wherein said electrostatic tacking means comprises means for applying a pulsed D.C. voltage to said electrostatic capstan roller and means for coupling an electrical ground potential to a supported web.

* * * * *